May 15, 1945.　　　　　E. BLAIS　　　　　2,375,763
APPARATUS FOR SHAPING TUBES
Filed July 30, 1940　　　16 Sheets-Sheet 1

INVENTOR
EMILIEN BLAIS
BY
Albert M. Austin
ATTORNEY

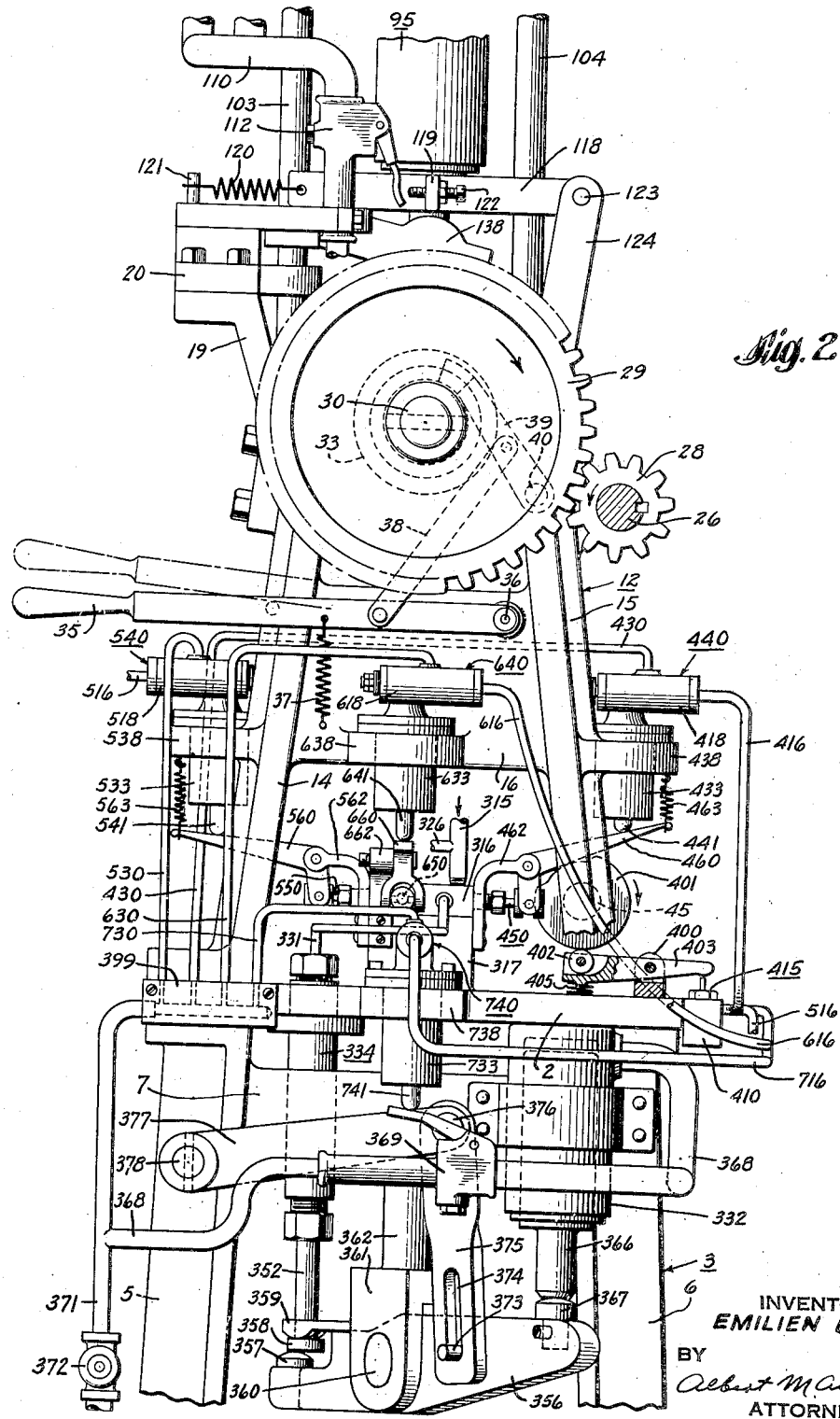

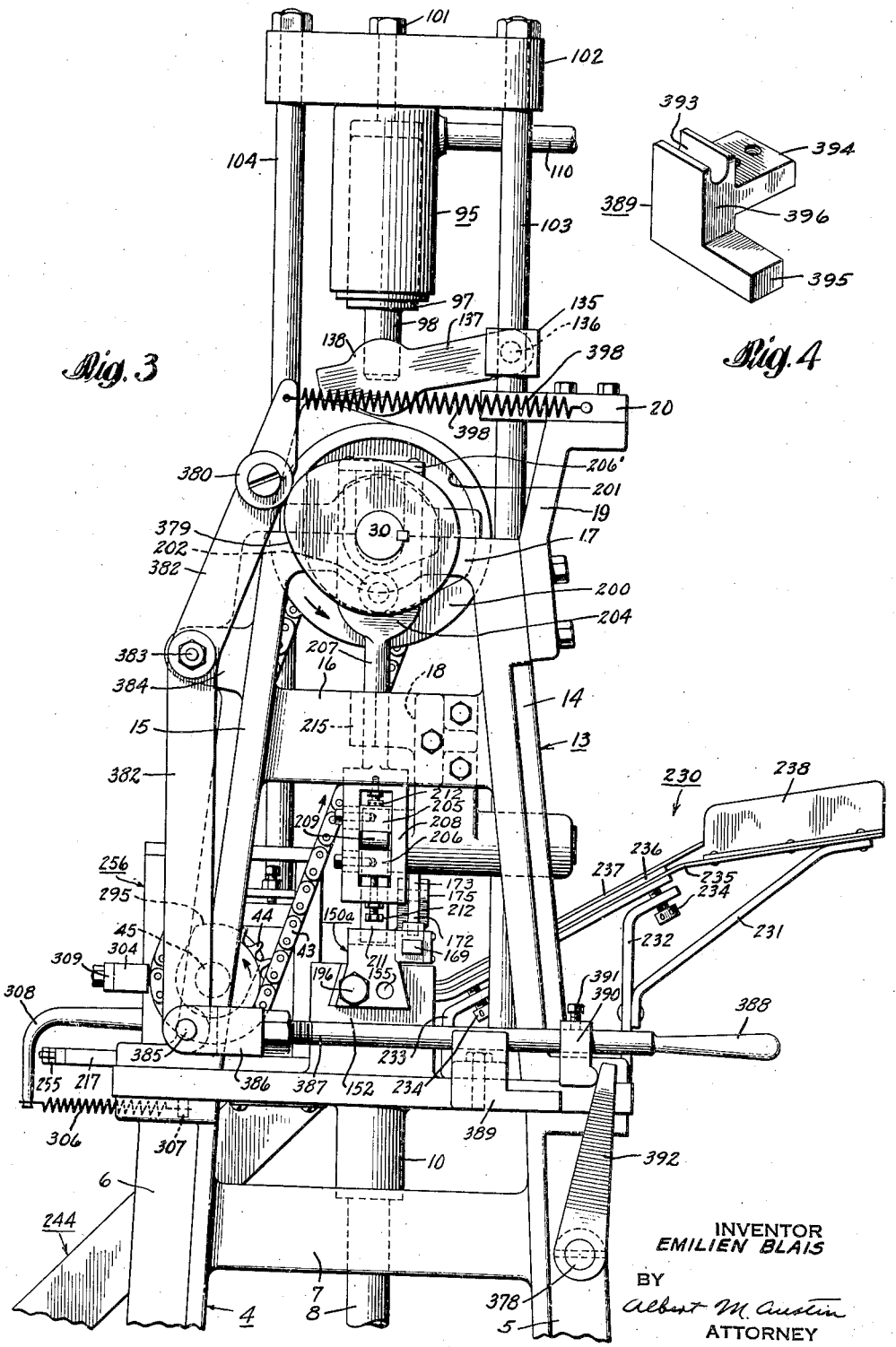

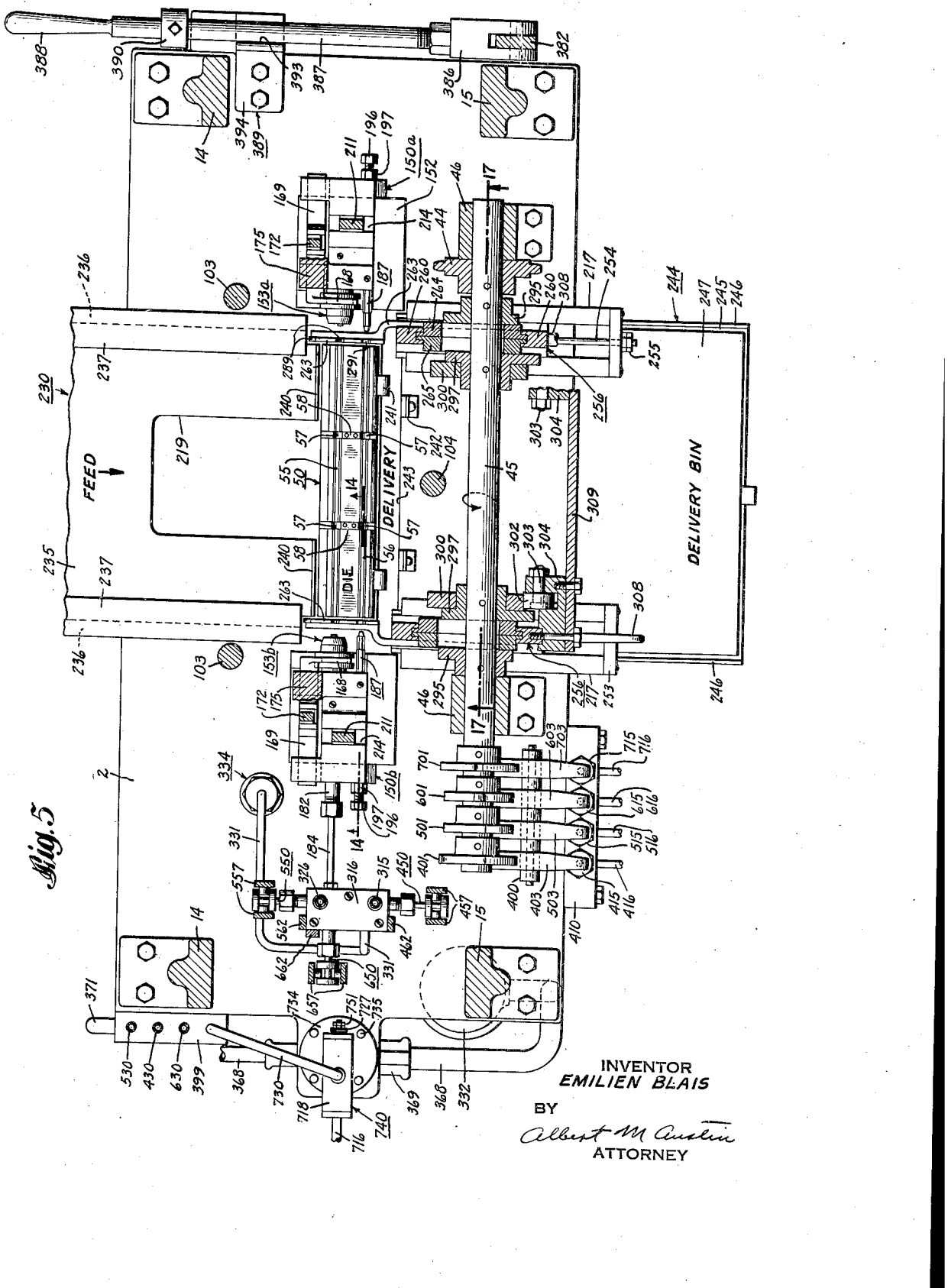

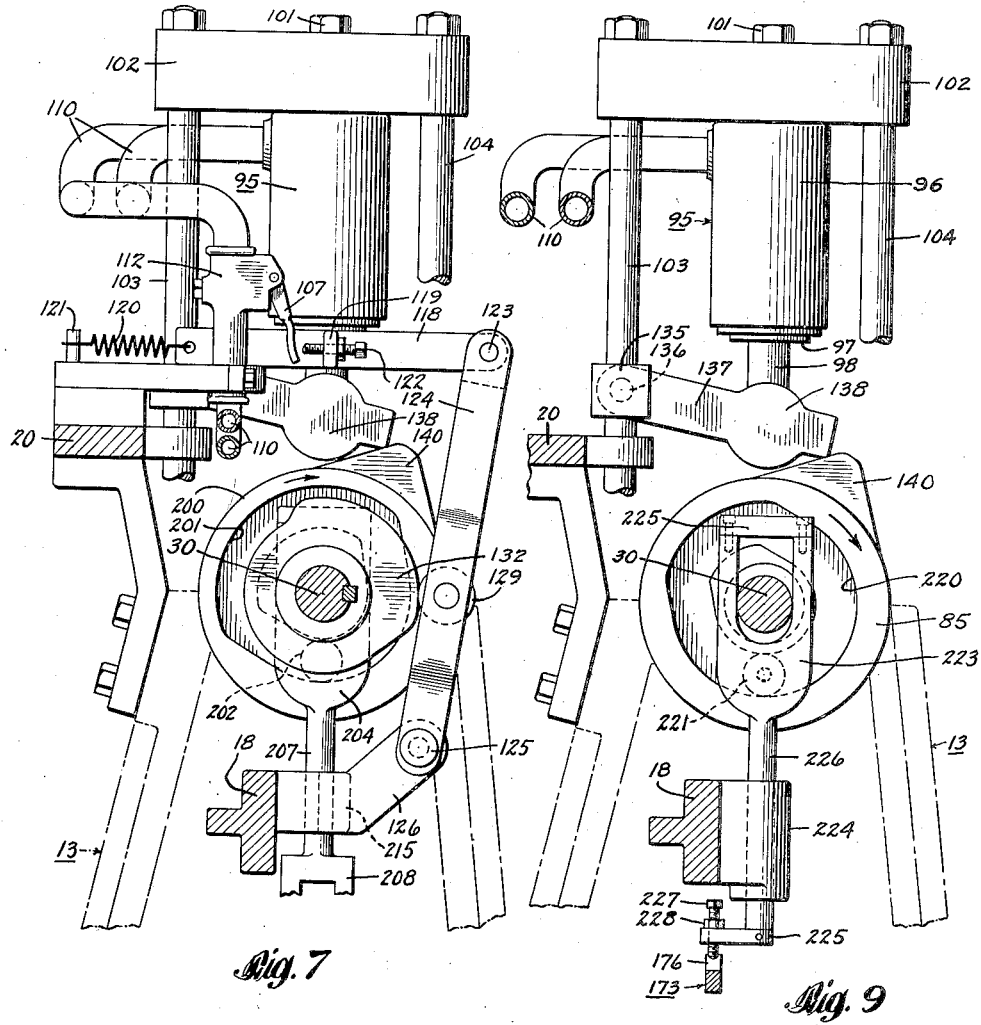

May 15, 1945.  E. BLAIS  2,375,763
APPARATUS FOR SHAPING TUBES
Filed July 30, 1940  16 Sheets-Sheet 7

INVENTOR
EMILIEN BLAIS
BY
Albert M. Austin
ATTORNEY

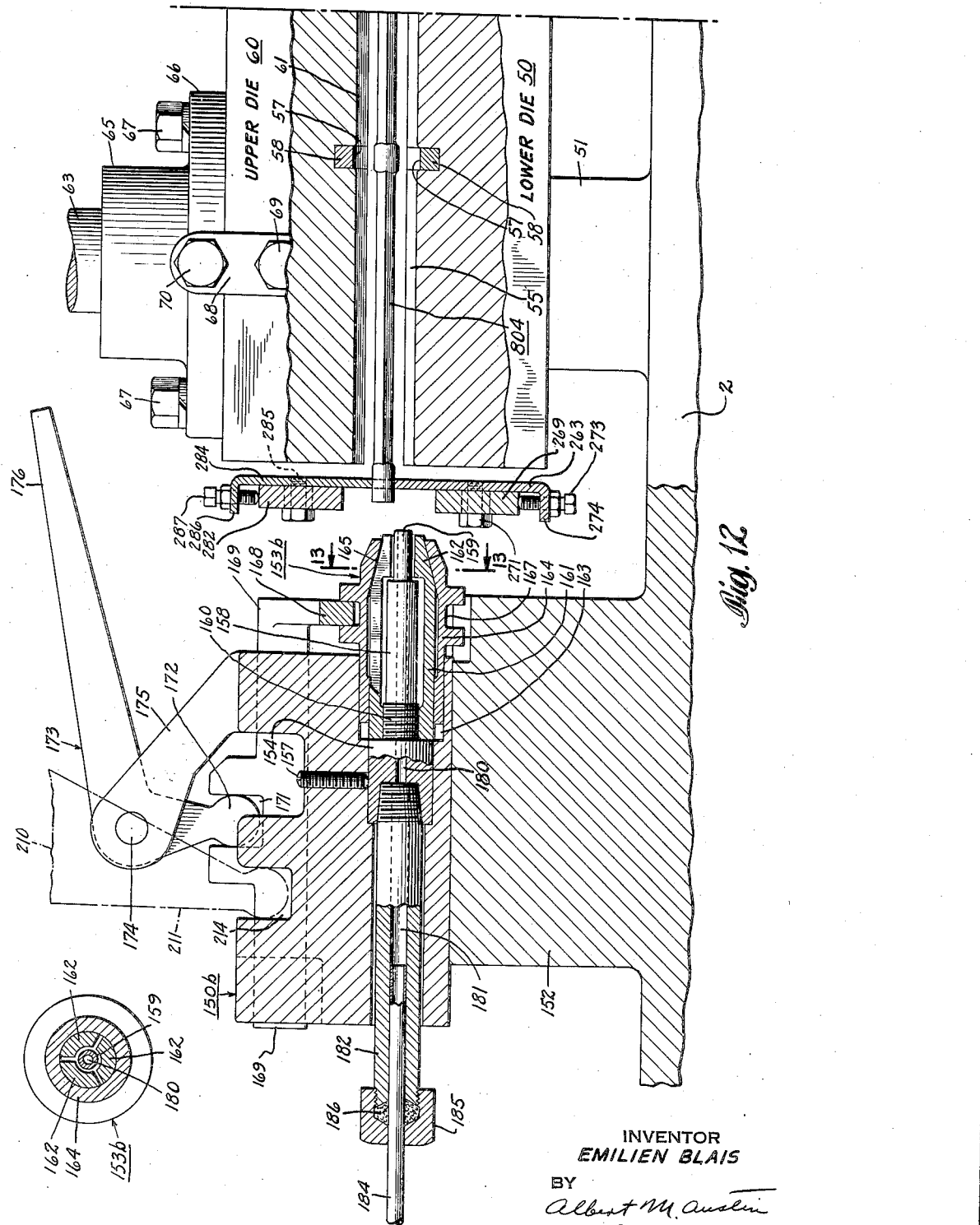

May 15, 1945. E. BLAIS 2,375,763
APPARATUS FOR SHAPING TUBES
Filed July 30, 1940 16 Sheets-Sheet 9
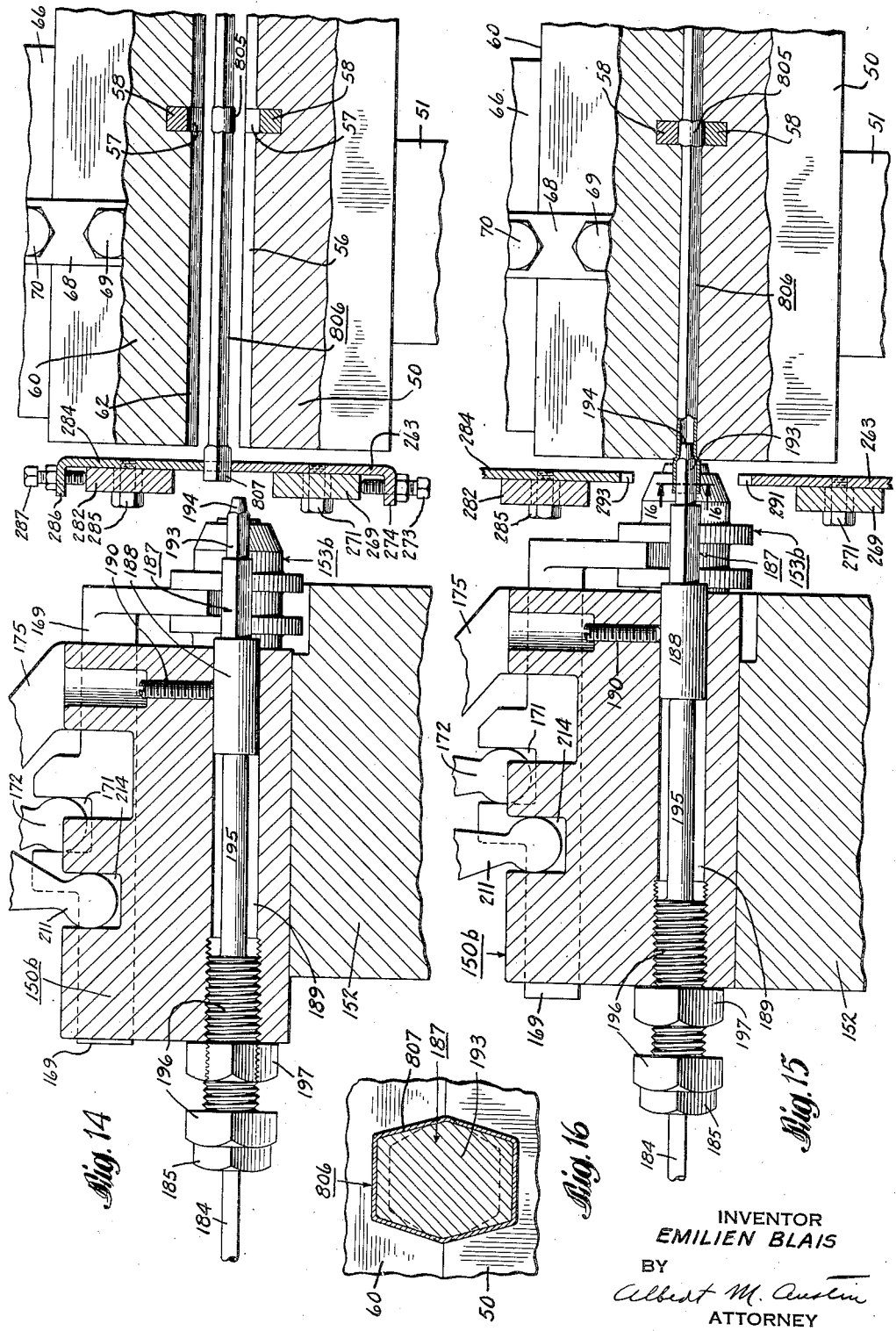
INVENTOR
EMILIEN BLAIS
BY
Albert M. Austin
ATTORNEY

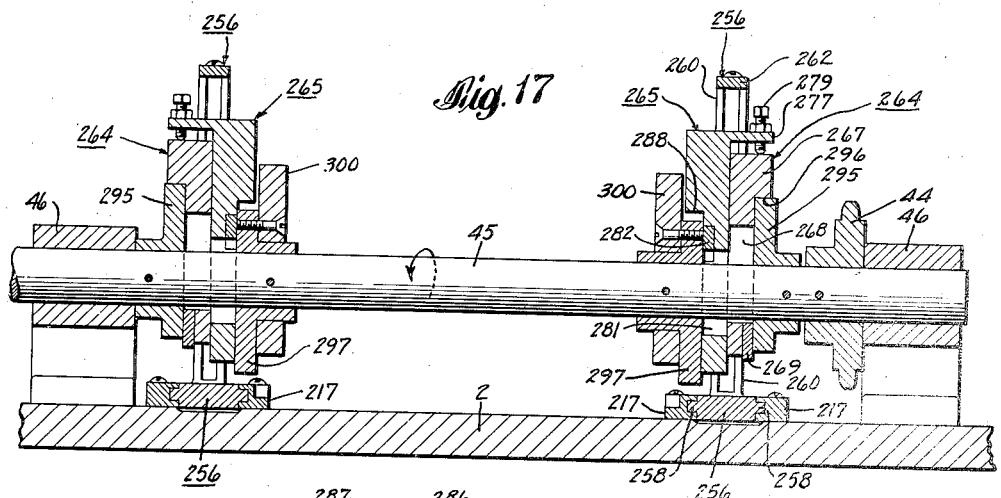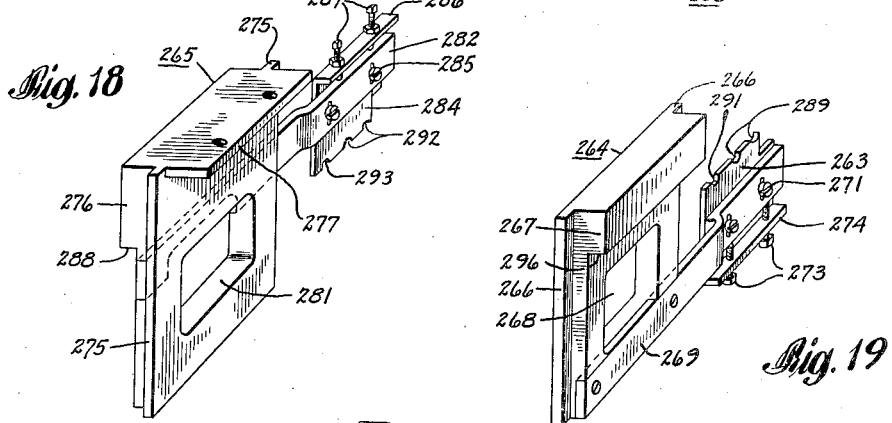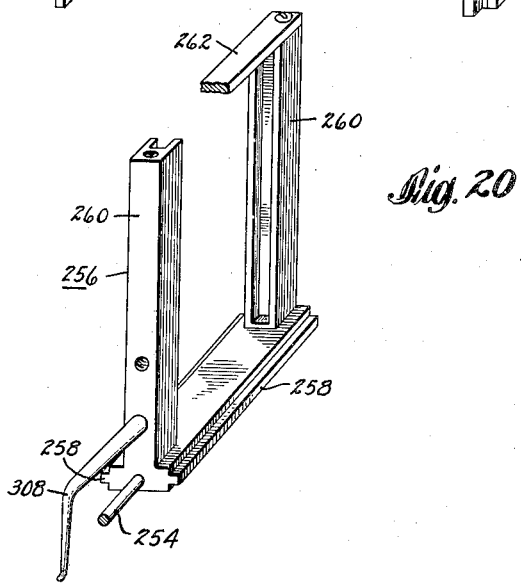

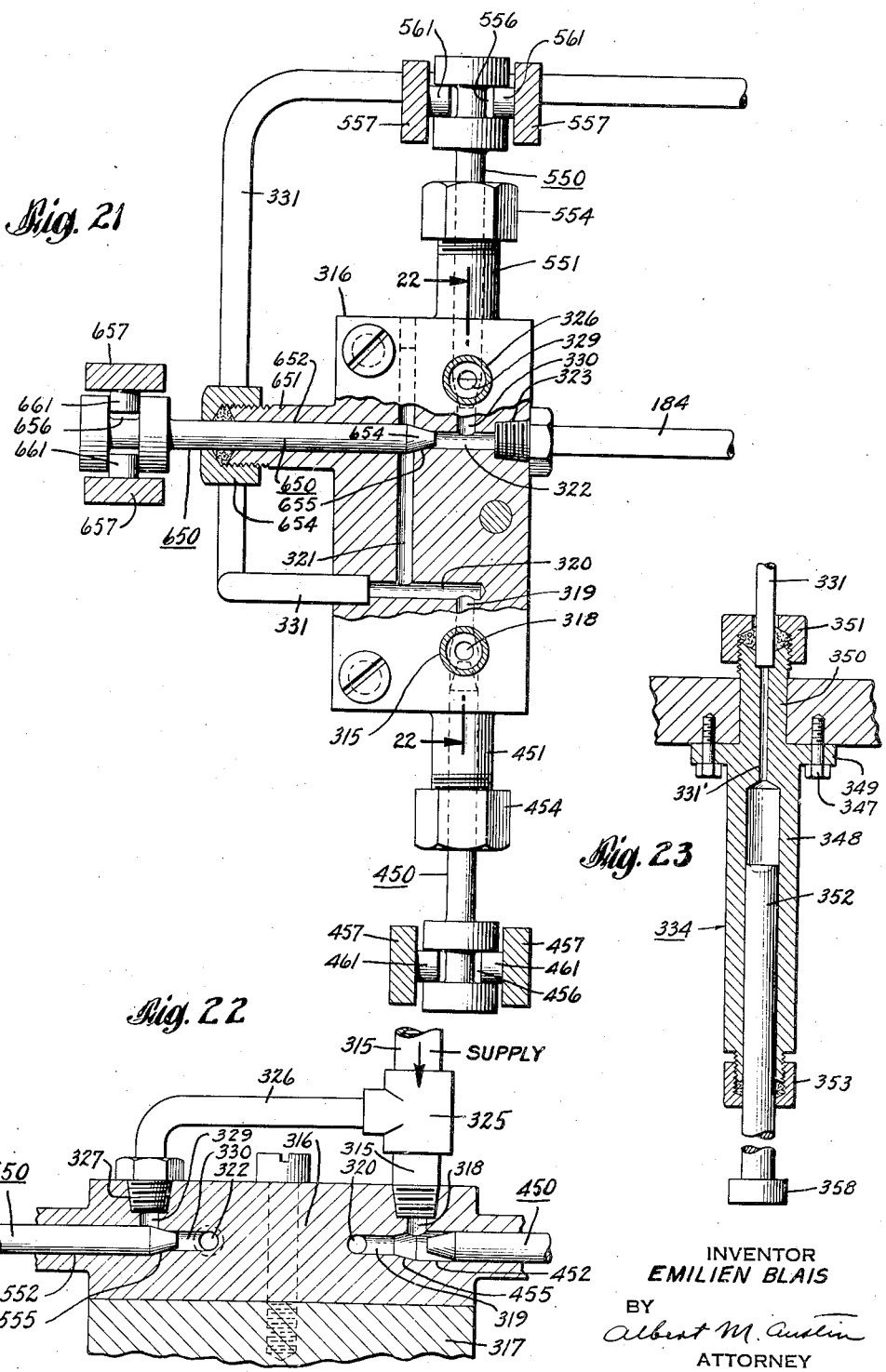

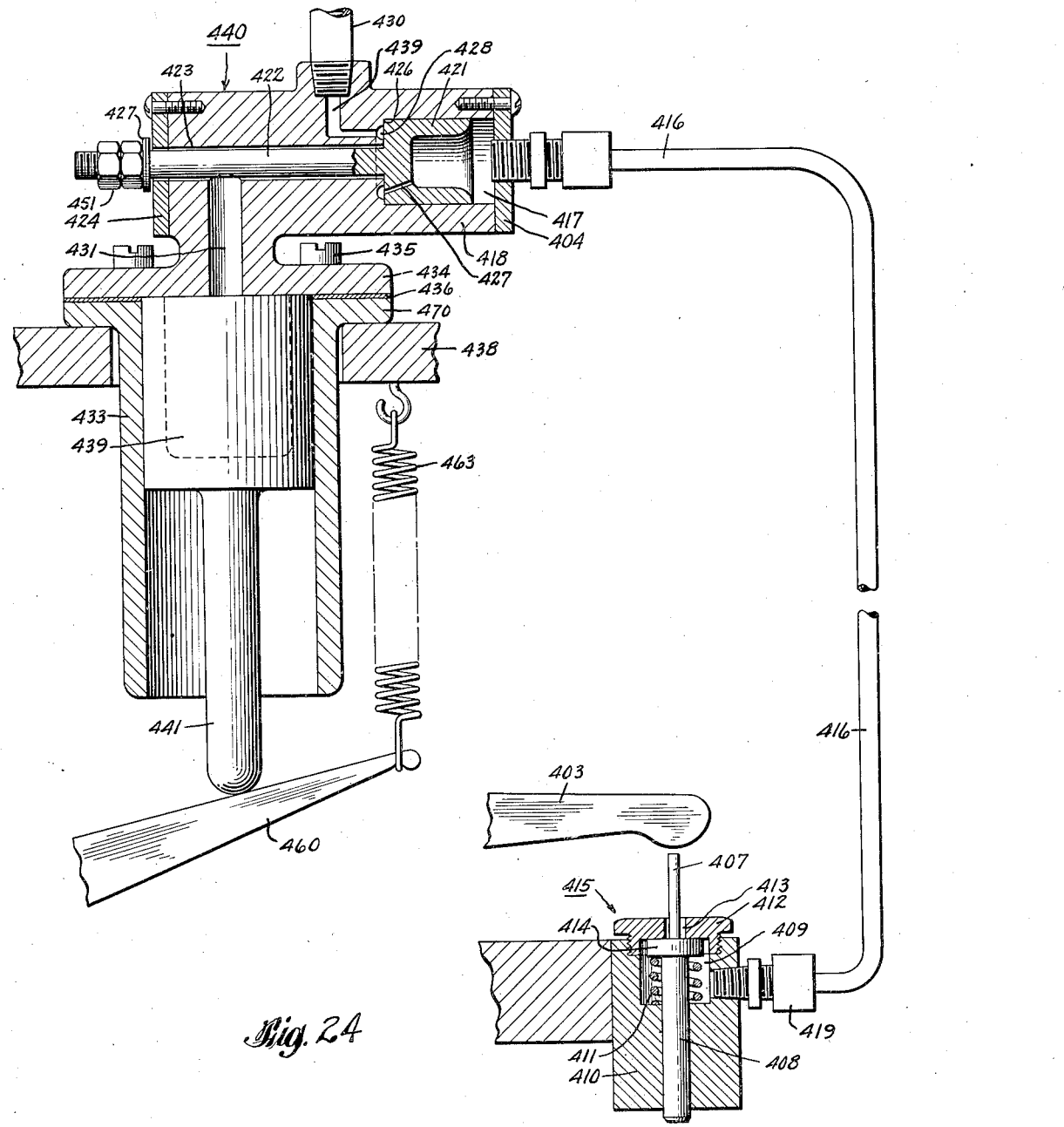

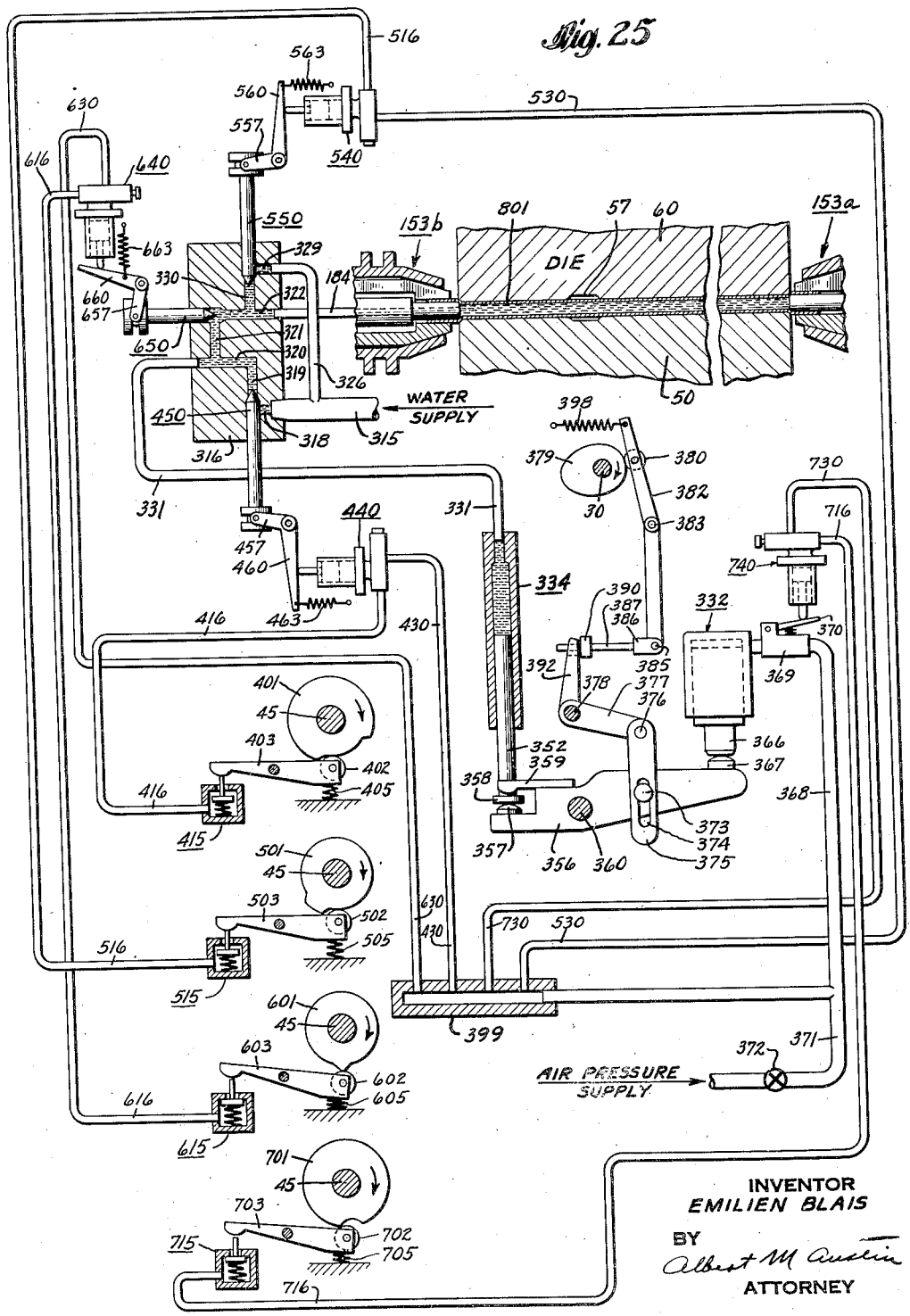

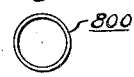
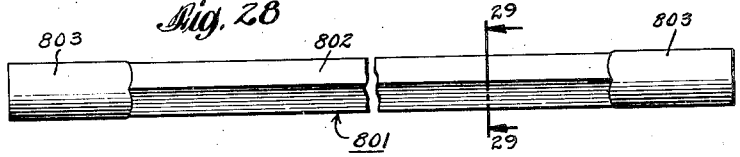
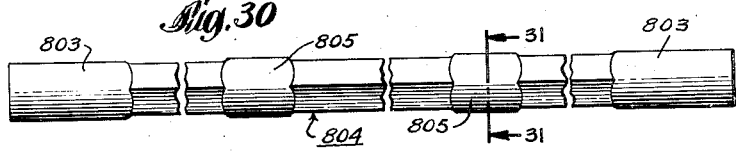
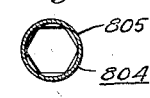
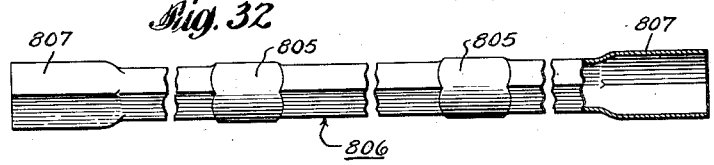
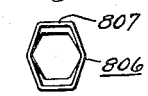
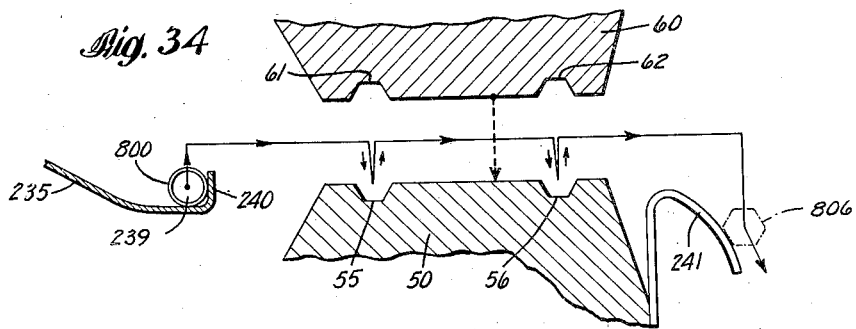
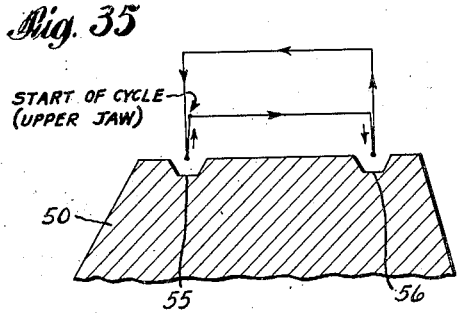
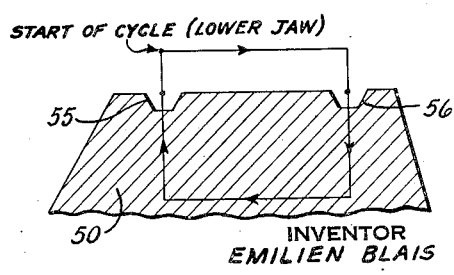

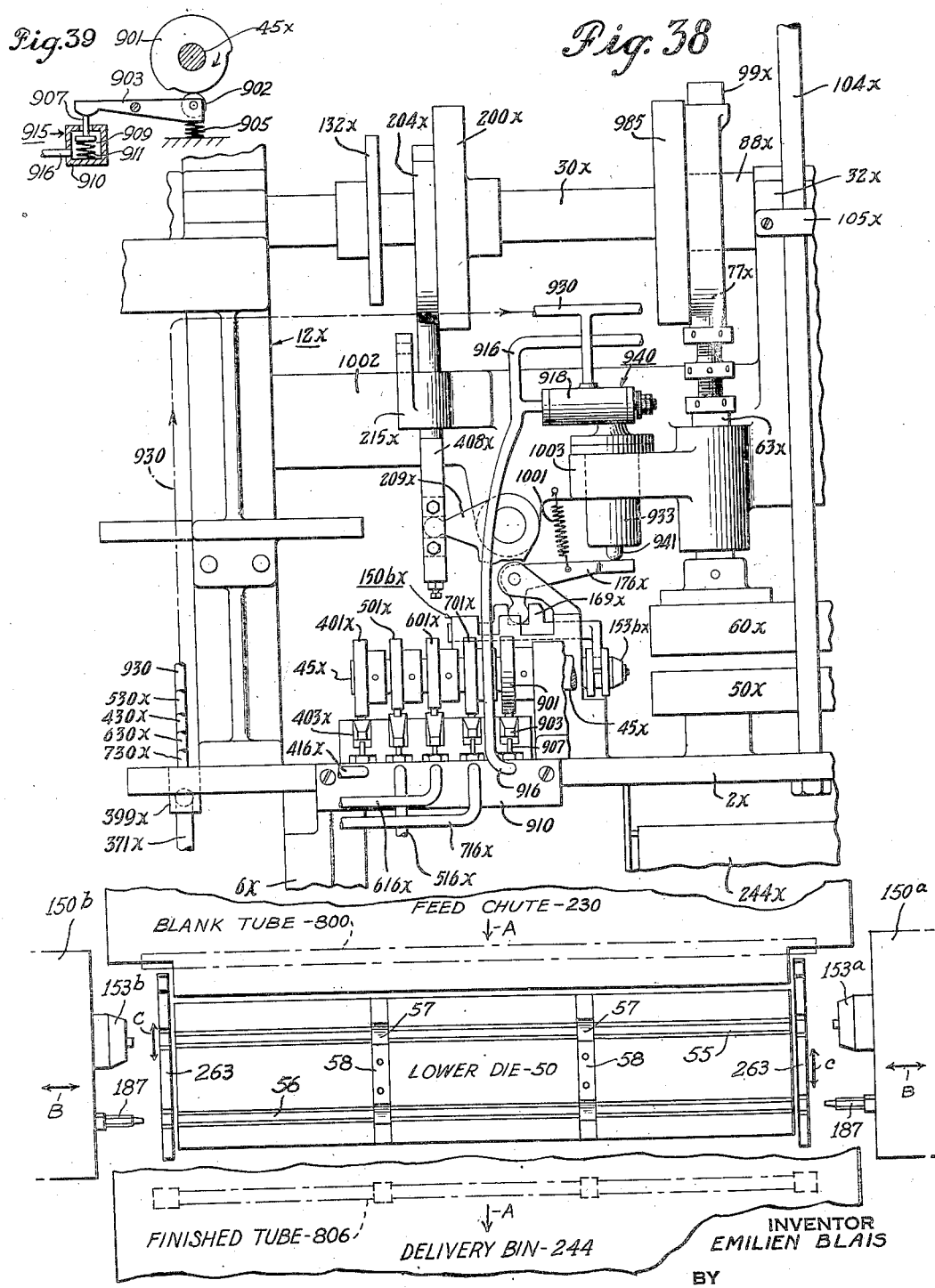

Patented May 15, 1945

2,375,763

UNITED STATES PATENT OFFICE 2,375,763

APPARATUS FOR SHAPING TUBES

Emilien Blais, New Haven, Conn., assignor to Olin Industries, Inc., a corporation of Delaware Application July 30, 1940, Serial No. 348,550

28 Claims. (Cl. 113—1)

This invention relates to apparatus for shaping tubes.

More particularly, the invention relates to a fully automatic, high production machine especially well adapted for accurately forming local enlargements or bulges in tubes, pipes and the like, intermediate the ends thereof. The machine is also capable of enlarging the ends of the tube and altering the shape of the entire tube body or limited portions thereof.

While the present invention is well adapted for application to the shaping of tubes of a wide variety of sizes, shapes and uses, it is especially well adapted for shaping seamless thin walled tubes, such as those employed in the construction of heat exchangers. The present invention, therefore, will be described, for the purposes of illustration, in connection with the shaping of seamless, thin walled tubes adapted for use in the construction of heat exchangers, such as radiators, inter-coolers and the like. Such tubes are usually formed with enlarged ends, whereby, when the tubes are assembled to form a core, the tube bodies are maintained in spaced relation to permit passage of one of the fluids therebetween. The tube bodies are often provided with bulges which abut bulges of adjacent tubes to reinforce the core intermediate the ends, and in certain cases, the bodies are given a polygonal shape, preferably hexagonal.

In accordance with a preferred embodiment of the present invention, the finished tube is formed from a thin wall, seamless tube blank which takes the form of an elongated tube of circular cross-section. The blank is deposited in a die cavity or chamber having the desired shape. The ends of the blank are closed and sealed. A pressure fluid is introduced into the blank and a shock-like blow is delivered to the fluid to cause the blank to assume the shape of the cavity. The ends of the blank are then enlarged, where this is desired, and given the desired shape.

The present invention contemplates the provision of suitable apparatus for carrying out the process rapidly and in an entirely automatic manner. The apparatus, in a preferred illustrative embodiment, comprises a set of dies having a suitably shaped cavity therein for bulging the tube and shaping the body, and a second cavity for holding the tube for the end-enlarging operation. The tube blanks are successively delivered, as by a chute, to a point adjacent the dies and a transfer mechanism including cam actuated jaws engageable with the blank carries it into the first cavity, whereafter the dies are closed by a cam mechanism and preferably a resilient die seating pressure is supplied suddenly, as by an air actuated hammer, to the dies to close them upon the blank thereby shaping the body, where this operation is desired. The dies are held closed by the resilient die seating pressure means.

The ends of the blank are promptly closed by end plugs which clamp the ends snugly around stems, whereafter water or other suitable pressure fluid is introduced into the blank through one of the end plugs. A shock-like pressure is applied to the fluid as by an air hammer to deliver a sharp blow to the blank, thereby expanding it against the walls of the cavity and forming the blank body to the desired shape.

The dies are then opened and the transfer mechanism advances the blank to the next cavity and simultaneously deposits a second blank in the first cavity. The dies are again closed and mandrels are forced into the ends of the blank to enlarge them and impart thereto the desired cross-sectional shape. The mandrels are actuated with the end plugs and thus the end enlarging of the first-named tube and bulging of the second-named tube are effected in a single cycle of operation. The dies are again opened and the first-named tube removed from the dies and delivered to a suitable delivery bin or discharged from the apparatus.

The several shaping operations form, in effect, a part of a single cycle of operation, thereby reducing the time required for completely shaping a tube. Also, certain operating and resetting movements occur simultaneously or in overlapping time relation and the several movements are automatically and effectively synchronized, thereby permitting maximum efficiency.

Fluid pressures are employed for various operations which require either substantial force or rapidity of operation, or both, such as seating the dies, applying the water pressure to the blank, actuating the water valves, and the like, thereby providing a machine which has, among other things, the advantages of light weight, low power consumption, rapidity of operation, and accuracy of control.

Various other features and advantages of the invention will be apparent from the following particular description and from an inspection of the accompanying drawings.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which Fig. 1 is a front elevational view of one form of apparatus constructed in accordance with my invention;

Fig. 2 is a left hand side elevational view of the principal portion of the apparatus, certain portions of the structure being omitted and others in section in order to show certain interior portions;

Fig. 3 is a right hand side elevational view of the principal portion of the apparatus;

Fig. 4 is an enlarged perspective view of a detail of construction;

Fig. 5 is a horizontal sectional view taken approximately along line 5—5 of Fig. 1;

Fig. 7 is an enlarged fragmentary cross-sectional view taken along line 7—7 of Fig. 1;

Fig. 8 is a perspective view of a detail of construction;

Fig. 9 is an enlarged, fragmentary vertical cross-sectional view taken along lines 9—9 of Fig. 1;

Fig. 10 is an enlarged, fragmentary cross-sectional view taken through one of the air hammer control valves, one of which is seen in Fig. 7;

Figs. 11 and 12 are continuing, enlarged, fragmentary, vertical cross-sectional views taken through the dies and showing particularly the end heads and clamping chucks carried thereby; Fig. 11 illustrating a tube being operated upon by an end head and Fig. 12 illustrating a tube being carried from one operation to another;

Fig. 13 is a fragmentary vertical cross-sectional view taken along line 13—13 of Fig. 12;

Fig. 14 is an enlarged fragmentary, vertical, cross-sectional view taken along line 14—14 of Fig. 5 and showing particularly one of the end forming mandrels;

Fig. 15 is a view similar to Fig. 14 only showing the parts in a different operative position;

Fig. 16 is an enlarged fragmentary vertical cross-sectional view taken along line 16—16 of Fig. 15;

Fig. 17 is an enlarged fragmentary cross-sectional view taken along line 17—17 of Fig. 5 and showing particularly the tube transfer mechanism;

Fig. 18 is a perspective view showing one of the upper transfer jaws and carrier;

Fig. 19 is a perspective view showing one of the lower transfer jaws and carrier;

Fig. 20 is a perspective view showing one of the transfer jaw carrier supporting frames;

Fig. 21 is an enlarged plan view similar to a portion of Fig. 5 showing particularly the water valve block and connections thereto, certain of the parts being broken away and in section to illustrate the interior construction;

Fig. 22 is an enlarged, fragmentary, vertical cross-sectional view taken along the line 22—22 of Fig. 21;

Fig. 23 is an enlarged, fragmentary, vertical cross-sectional view taken through the water ram;

Fig. 24 is an enlarged, vertical cross-sectional view taken through a pilot valve and connected master valve;

Fig. 25 is a diagrammatic view of the water supply system and the control system therefor;

Fig. 26 is a side view of a tube blank in its condition prior to the forming operations;

Fig. 27 is an end view of the tube of Fig. 26;

Fig. 28 is a side view of an intermediate tube blank after the body has been formed to hexagonal shape;

Fig. 29 is a transverse cross-sectional view taken along the line 29—29 of Fig. 28;

Fig. 30 is a side view of an intermediate tube blank after the body has been bulged;

Fig. 31 is a transverse cross-sectional view taken along line 31—31 of Fig. 30;

Fig. 32 is a side view of a completed tube after the ends have been expanded;

Fig. 33 is an end view of the tube of Fig. 32;

Fig. 34 is a diagrammatic sectional view taken transversely through the feed chute and dies and illustrating the path of travel of a tube through the dies;

Fig. 35 is a transverse sectional view through the lower die, showing diagrammatically the path of movement of the upper transfer jaw;

Fig. 36 is a view analogous to Fig. 35 only showing diagrammatically the path of travel of the lower transfer jaw;

Fig. 38 is a fragmentary view corresponding to a portion of Fig. 1, only showing a second embodiment of the invention wherein air controlled relays are employed in place of cams, for actuating the clamping chucks;

Fig. 39 is a fragmentary sectional and somewhat diagrammatic view showing the air valve for the additional air controlled relay shown in Fig. 38; and Fig. 40 represents a diagram of the machine to assist in explaining its operation.

Figure 1:
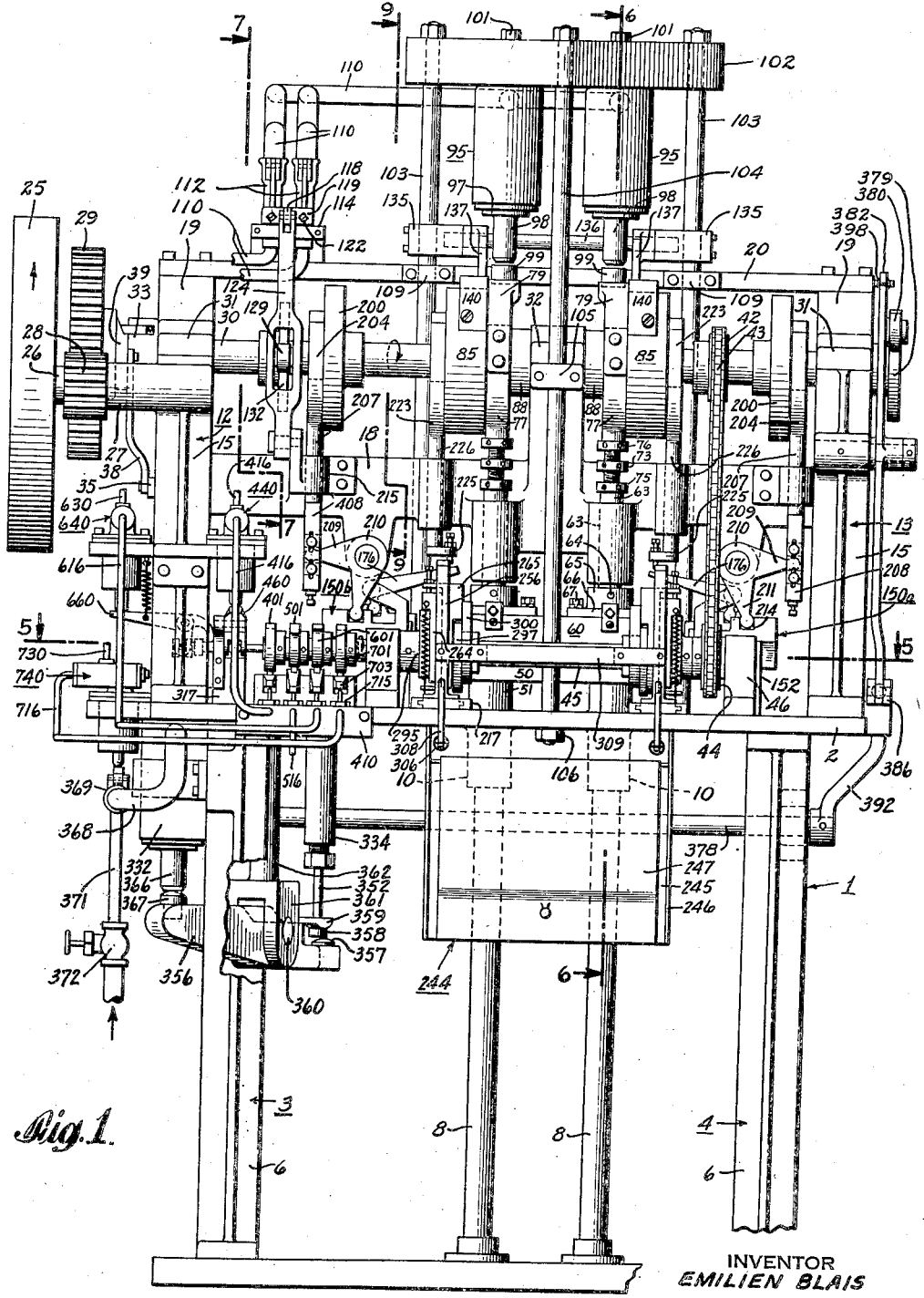

In the following description and in the claims, various details will be identified by specific names for convenience, but they are intended to be as generic in their application as the art will permit. Like reference characters denote like parts in the several figures of the drawings.

The general operations

The tube blank is formed from a metal having sufficient ductility to permit working and whatever other properties may be desired for the specific purpose for which the tube is to be used. For example, where the tube is to be used in making a heat exchanger, the metal should have good heat conductivity, sufficient resistance to rust and corrosion and sufficient mechanical strength. Preferably the metal employed for such purpose is copper or a copper alloy. In any event it is important that the metal shall be free of impurities and especially that it shall be oxygen-free, in order that the finished tube shall be free of defects.

The tube blank preferably is formed generally in accordance with a known process wherein the metal from which the tube blank is to be formed is extruded to form a rod. Slugs or billets are then sheared from the rod, and the slugs or billets are formed by an indenting operation into the shape of a cup or indented cylinder and the latter is extruded, in a single operation, to form an elongated thin wall tube blank of circular cross-section.

The tube blank is then provided with one or more local enlargements or bulges intermediate the ends. In certain cases it is desirable to form the body of the tube to a shape other than circular, as for example, hexagonal, and in that event, a body shaping operation preferably is effected prior to or substantially simultaneously with the bulging of the body. In certain cases, and especially where the tube is to be employed in forming heat exchanger cores, the ends of the tubes are enlarged and preferably are given a hexagonal cross-sectional shape.

The bulging of the tube is accomplished by disposing the tube in a suitable form or set of dies having a cavity corresponding in shape to that desired in the tube, and introducing into the tube a fluid which preferably is incompressible. Pressure is applied to the fluid with shock-like suddenness and intensity of forcibly expand the tube, or predetermined portions thereof, outwardly against the wall of the die cavity, thereby imparting the desired shape to the tube or portions thereof. Where the tube body is to be shaped to hexagonal or other cross-sectional form, this preferably is accomplished by providing the dies with a cavity of suitable shape and by forcibly closing the dies against the tube to plastically deform the tube to the desired shape.

The ends of the tube are enlarged, and where desired, are suitably shaped by inserting therein mandrels or punches of the desired size and shape. While this may be accomplished while the tube is in the die cavity in which the bulging operation is carried out, preferably the tube is transferred to a second cavity for the end enlarging operation.

The tube blanks and tube

There is illustrated in Figs. 26 to 33, a tube blank suitable for forming a tube in accordance with the invention and a finished tube, as well as the tube blank in its several conditions during intermediate steps in the operation, according to the preferred method.

The tube blank 800 (Figs. 26 and 27) comprises an elongated, seamless thin-walled, tube having a circular cross-section. In the first operation (hereinafter described) upon the tube blank 800, the body portion 802 intermediate the ends is formed to an hexagonal cross-section by a pressing operation, the ends 803 being substantially undisturbed and retaining their circular cross-sectional shape, thereby providing an intermediate blank 801 (Figs. 28 and 29).

The first intermediate tube blank 801 is next expanded at spaced portions thereof or "bulged" to form bulges 805 (Figs. 30 and 31) of generally circular cross-sectional form. The remainder of the body portion 802, and the end 803 are not affected and a second intermediate tube blank 804 is thus provided.

In the final operation, the second intermediate tube blank 804 is formed into the finished tube 806 (Figs. 32 and 33) by expanding the ends 807, and at the same time imparting to the ends a generally hexagonal cross-sectional shape; preferably the hexagon is somewhat elongated laterally and narrowed, as illustrated particularly in Fig. 33. In the final operation the body 802 and the bulges 805 preferably are not substantially affected.

Preferably, all of the shaping operations are carried out by cold working of the respective tube blanks. It is usually found desirable therefore, after the tube blank 800 has been extruded, to anneal the end portions and the portions at which the bulges are to be formed to prevent rupture of the blanks.

The operations in accordance with the present invention are adapted for application to the formation of tubes of widely varying sizes, cross-sectional shapes, wall thicknesses and materials. However, the invention is especially well adapted for shaping tubes such as are employed in constructing radiators, inter-coolers and other heat exchangers for use with internal combustion engines, and the illustrative embodiment represents a machine used for such purpose.

The general layout of the machine

Referring now also to Fig. 40, which illustrates diagrammatically the layout of the machine, this figure represents substantially a horizontal section through the machine in the path of tube movement.

It will be understood that in this chapter only sufficient description will be given to illustrate generally how the several operations are performed on the tubes by the machine and the manner of travel of the tubes through the machine. The exact structure of the several parts and their operations in detail are given hereinafter.

The path of movement of the blank tubes through the machine, indicated by arrows A, is substantially horizontal and the tubes move in a direction perpendicular to their length and parallel to themselves. The feed chute 230 holds a plurality of tube blanks 800, one of which is shown for purposes of illustration. These tubes are fed to forming dies, the lower section of which is indicated by 50, the complementary upper section not being shown in this figure.

The lower section 50 has two die cavities, one indicated by 55 and the other by 56. The tubes are transferred successively to these die cavities and thence to a delivery bin 244. The finished tubes 806, which collect in the delivery bin, are used for forming heat exchanger cores and the like, as will be understood by those skilled in the art.

Cooperating with the die section 50 are two end heads 150a and 150b reciprocable, as indicated by the arrows B, in a direction longitudinally of the tubes and of the die section. These end heads carry chucks 153a and 153b and mandrels 187. The end heads move in and out together, and while the chucks 153a and 153b are operating upon a tube in cavity 55, the mandrels 187 are operating upon another tube in cavity 56.

After the tube blanks 800 are transferred to the first die cavity 55, the upper and lower dies come together with a shock to hex the bodies of tubes as indicated by tube 801 in Fig. 28. After the body hexing operation, the chucks 153a and 153b surround the ends of the tubes which overhang the die section 50 forming tight seals therewith and water is introduced under pressure and with a shock to form the enlargements or bulges 805, the thin wall of the tube expanding in the bulge cavities 57 located in insets 58.

The dies then open and the tube, of shape indicated by 804 in Fig. 30, is transferred to die cavity 56 and at the same time, another tube is transferred from the feed chute 230 to the die cavity 55. The dies again close, and while the aforementioned operation is being performed on the tube in die cavity 55, the expanding mandrels 87 enter the tube in die cavity 56 to hex the ends 807 as indicated by the tube 808 in Fig. 32.

After this operation is performed, the tube in die cavity 56 is transferred to the delivery bin 244 and the preceding tubes are transferred to successive positions.

The transfer devices for moving the tubes from the feed chute 230 successively through the die cavities 55 and 56 to the delivery bin 244, are indicated by 263. These transfer devices comprise upper and lower jaws, the lower jaws only being indicated in this figure. These upper and lower jaws partake of a vertical movement perpendicular to the plane of the paper, at times, and after the jaws are clamped together, they partake of a movement in the direction of tube travel, as indicated by the arrows C. The lower jaws have equi-spaced notches which pick up the tubes, three at a time, transferring them to their succeeding positions for successive operations, after which the transfer devices return to pick up three tubes again, and transfer them one step.

The tube blank 800 in Fig. 40 is shown, for purposes of clarity, just before it rolls by gravity to the end of chute 230 in register with the first notches in jaws 263.

The position of the transfer jaws 263, shown in Fig. 40, is such that they are ready to pick up tubes in feed chute 230, in die cavity 55 and in die cavity 56 and transfer them to succeeding positions, the tube taken from die cavity 56 being dropped into delivery bin 244.

The main frame

Figure 6:
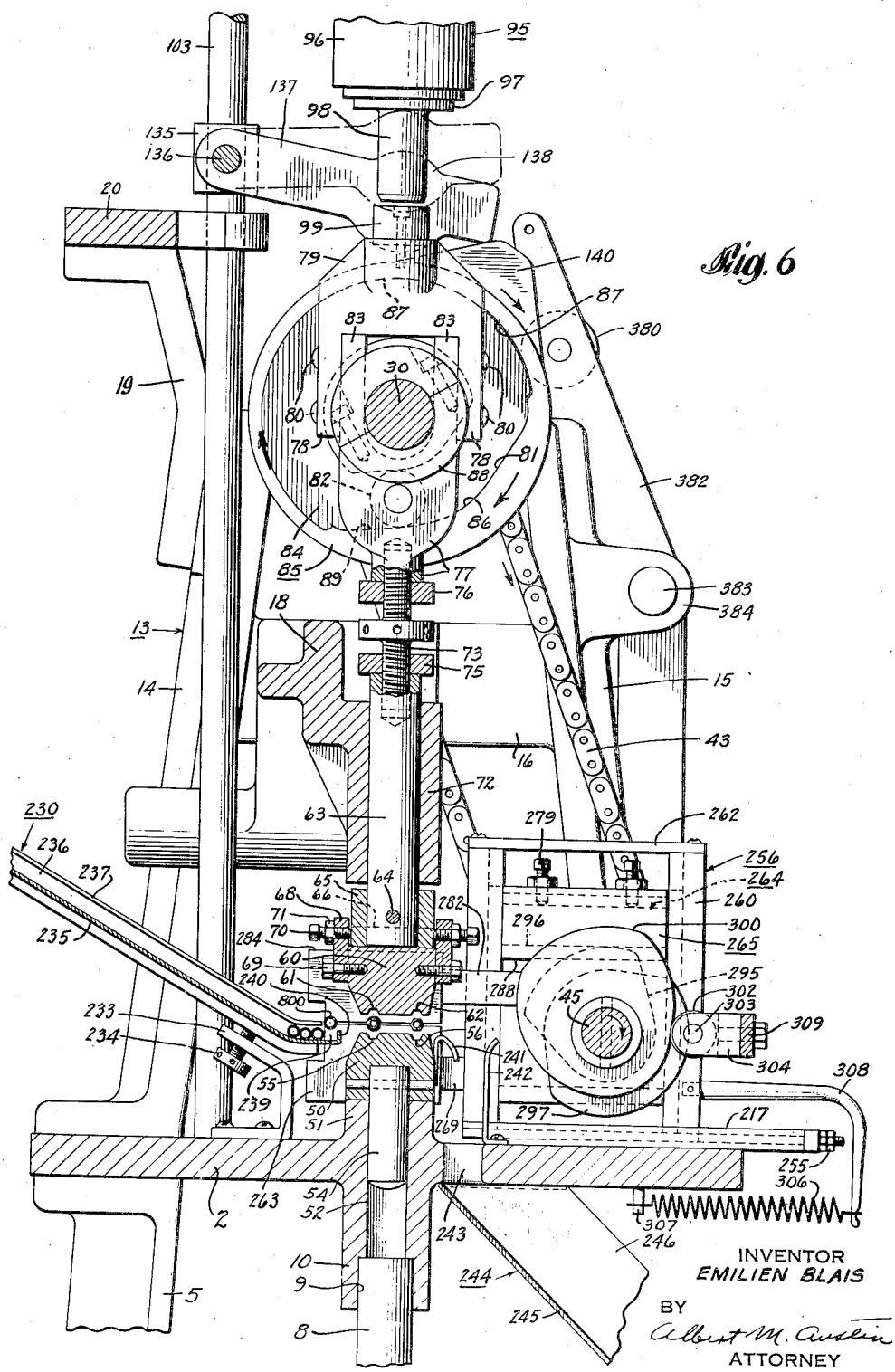
Fig. 6 is an enlarged, fragmentary vertical cross-sectional view taken along line 6—6 of Fig. 1.

Referring now particularly to Figs. 1, 2, 3 and 6, the apparatus comprises a main frame 1 including a bed plate 2, suitably supported as by pedestals 3 and 4, each of which preferably comprises legs 5 and 6 connected at their upper ends by a cross bar 7 and preferably secured to a suitable base, such as a building floor. The central portion of the bed plate 2 is additionally supported by center legs 8, which enter recesses 9 (one of which is seen in Fig. 6) in sockets 10 secured to or integral with the bed plate 2, preferably at points located under the dies hereinafter described. If desired, the bed plate 2 may alternatively be supported upon a single pedestal (not shown) suitably formed and of sufficient strength to support the structure.

Upstanding from the bed plate 2, preferably adjacent the ends thereof, and rigidly secured thereto, are spaced brackets 12 and 13, each of which includes spaced legs 14 and 15 connected by cross bars 16 and 17. A bearing block in the form of a cross bar 18 extends across the machine between the brackets 12 and 13 and is suitably secured thereto.

Generally L-shaped brackets 19 (Fig. 3) extend upwardly from the side brackets 12 and 13 and support a top cross bar 20.

The main drive

The machine may be driven from any suitable source of power and in the present example, is illustrated as adapted for connection to a belt drive.

A belt pulley 25 (Fig. 1), which also serves as a fly-wheel, is carried on a shaft 26 journaled in a bearing 27 supported by the bracket 12. The shaft 26 has keyed thereto a pinion 28 meshing with a drive gear 29, carried on the main drive shaft 30. The main drive shaft 30 extends across the machine and is journaled in side bearings 31, 31 in the brackets 12 and 13 respectively, and a center bearing 32 on the main cross bar 18.

The drive gear 29 is carried on and operatively connected to the main drive shaft 30 preferably by a so-called "one revolution" clutch 33 of known construction which is not disclosed in detail herein as the details of construction thereof form no part of the present invention. The clutch 33 is controlled by a hand lever 35 (Fig. 2) pivoted on the bracket 12 and maintained in inoperative position by a spring 37. The lever is connected by a link 38 to a lever 39, pivoted to the frame at 40 and adapted to actuate the clutch, in a known manner, upon suitable manipulation of the hand lever 35 to connect or disconnect the driving gear 29 and the main drive shaft 30. The one revolution clutch, when disengaged, stops the main drive shaft 30 always at the same point in the cycle of operation. Certain of the several figures of drawings (see especially Figs. 1, 2, 3, 6 and 38) illustrate the machine in this position, which position is represented by the "0°" line of Fig. 37.

Carried on the main drive shaft 30 near the right hand side of the machine (as viewed in Fig. 1 is an upper sprocket 42, over which is trained a chain 43, also trained around a lower sprocket 44 carried on a cam shaft 45 located adjacent the bed plate 2 and journaled in bearings 46 rigidly supported on the bed plate 2.

The lower die

Removably mounted centrally of the bed plate 2 is a lower die 50 (Figs. 1, 5 and 6) supported upon spaced bosses 51, formed on the bed plate 2; the die 50 is positioned by depending studs 54 (Fig. 6) pinned to the die and extending into bores 52 in the bosses 51. The lower die 50 is provided with recesses or cavities 55, 56 of the desired shape, and in the present machine, these are of semi-hexagonal shape and have enlarged semi-circular portions 57 (Fig. 12) intermediate the ends thereof. Replaceable insets 58 extending across the die may be provided for defining the enlarged semi-circular recesses 57.

The upper die

Mounted in position to cooperate with the lower die 50 and to constitute therewith a mould is a vertically movable upper die 60 (see particularly Figs. 1, 6 and 11) of generally similar construction having therein recesses or cavities 61, 62 complementary in shape with the recesses 55 and 56 of the lower die 50. The recesses 55 and 61 are of such shape that when the dies 50 and 60 are in closed position, the recesses together form a cavity or chamber (hereinafter called the "first die cavity") of elongated form having a generally hexagonal cross-sectional shape, except at spaced portions thereof, which are circular in cross-section and are slightly greater in diameter than the remainder of the cavity. The recesses 56 and 62 similarly constitute a "second die cavity."

The front and rear faces of the dies 50 and 60 are beveled as indicated especially in Fig. 6, thereby minimizing the extent of the abutting surfaces of the dies.

The upper die 60 is detachably carried by one or more, and in the present case, two vertically reciprocable rods 63 and 63 (Figs. 1 and 6) each of which cooperates with a suitable mechanism (hereinafter described) for supporting and actuating the die. Inasmuch as the rods 63 and their associated mechanisms are similar in construction (although to some extent enantiomorphous), only one of these constructions will be described in detail, it being understood that, insofar as the other is not described it is similar to the described portions.

The rod 63 (Fig. 6) has secured to its lower end, as by pin 64, a sleeve 65 formed with a flange 66, which is secured as by bolts 67 (Fig. 11) to the upper die 60. Referring to Fig. 6, a plurality of straps 68, 68 are secured, as by bolts 69, to the die 60 and carry adjusting screws 70 and nuts 71, permitting adjustable setting of the die 60 relative to the rod 63.

The rod 63 is slidably received in a bearing 72 (Figs. 1 and 6) preferably integral with the main cross bar 18, and is suspended at its upper end by an adjusting bolt 73 threaded into a yoke 77, locking nuts 75 and 76 being provided for locking the adjusting bolt 73 in position. The vertical position of the upper die 60 can thus be adjusted relatively to its supporting mechanism.

The yoke 77 has arms 83 which span the main drive shaft 30 and permit vertical movement of the yoke 77. Spaced arms 78 of an upper yoke 79 receive the yoke 77 and are secured as by bolts 80.

The yoke 77 carries a cam follower 82 which rides in a cam track 84 formed in a cam 85 mounted on the main drive shaft 30. The cam track 84 has an inclined portion 89 shaped to cooperate with the follower 82 to lift the yoke 77, a high portion 86 to hold the yoke in raised position, an inclined portion 81 to cause the yoke 77 to move downwardly, and a relieved portion 87 adapted to permit the follower 82 to ride free of the outer side wall of the cam track 84.

Disposed between the yoke 77 (see Fig. 1) and the center bearing 32 is a split spacer ringe 88, the two halves being secured together by bolts.

Assuming the upper die 60 to be in its uppermost position, as illustrated particularly in Fig. 6, suitable rotation of the main drive shaft 30 permits the follower 82 to ride into the inclined portion 81 of the cam track 84 whereby the yoke 77 and the upper die 60 are lowered until the upper die 60 bears against the lower die 50 in closed position.

Upon further rotation of the main drive shaft 30, the cam 85 rotates into a position wherein the relieved portion 87 of the cam track is opposite the follower 82 and accordingly the follower 82 does not bear upon the outer wall of the cam track; the upper die 60 and its supporting mechanism then are supported solely by the lower die 50 and are entirely free of the outer wall of the cam 85.

Still further rotation of the main drive shaft 30 brings the inclined portion 89 opposite the follower 82 and the upper die 60 is again raised into open position.

The die hammers

Die hammers are provided for the purpose of delivering a hammer blow to the upper die to effect the shaping of the tube body by a rapid closing movement of the upper die after it has been lowered into a position close to or substantially against the lower die. The hammers also force the dies firmly into contact and resiliently hold them tightly in closed position even after substantial wear of the machine.

Disposed above the yoke 79, in position to cooperate therewith are air hammers 95 (Figs. 1 2, 6 and 9) which are similar in construction. The air hammer 95 may be of any ordinary construction and may comprise a cylinder 96 slidably receiving a piston 97 carrying a hammer head 98 adapted to strike an anvil 99 (Figs. 1 and 6) secured as by bolts to the upper portion of the yoke 79 or integral therewith.

The air hammer 95 is secured as by a bolt 101 (Figs. 1, 3 and 7) to a generally V-shaped bracket 102 supported by upstanding side rods 103 extending through brackets 109 secured to the upper cross bar 20 and secured in the bed plate 2 and a center rod 104 extending through a bracket 105 and secured in the bed plate 2; the side rods 103 and center rod 104 are suitably secured as by nuts 106.

The air hammers 95 are supplied with compressed air from a suitable source (not shown) by two conduits 110, each having therein a valve 112. The valves 112 are secured, as by a clamp and bolt, to a bracket 114 which is in turn secured to the cross bar 20.

The air valves 112 are similar in construction and one of them is illustrated in detail in Fig. 10 and comprises a housing 140 having a partition 141 separating the interior into a high pressure chamber 198 and a low pressure chamber 199. The partition 141 is formed with a valve stem opening 142 providing communication between the chambers 198 and 199 and constituting a valve seat. A valve stem 143, slidable in a sealing sleeve 149, extends through the opening 142 and through the side wall of the housing 140 and is normally urged into closed position against the seat in the partition 140 by a spring 144. A passage 147 extends in the valve stem 143 and communicates, at its inner end with a plurality of passages 146, leading to the lower pressure chamber 199 and at its outer end with a plurality of passages 148 leading to the atmosphere. An operating lever 107 is pivoted at 108 to the housing and bears against the end of the valve stem 143.

When the stem 143 is seated against the partition 141, no air can flow from one side of the housing to the other and communication is provided between the low pressure chamber 199 and the atmosphere through the passages 146, 147 and 148, thus permitting air to bleed from the cylinder 96 of the hammer 95. When the operating lever 107 is urged inwardly, it moves the valve stem 143 inwardly and out of its seat to provide communication between the high pressure chamber 198 and the low pressure chamber 199 and at the same time, the opening 148 is moved into the sealing sleeve 149, thus closing communication between the valve housing and the atmosphere.

Reciprocably mounted for cooperation with the operating levers 107 of the valves 112 is a pusher bar 118 (see Figs. 1 and 7) having cross arms 119 carrying screws 122 adapted to abut the operating levers 107. The pusher bar 118 is normally urged to the rear (to the left, as viewed in Fig. 7) to bring the screws 122 into engagement with the operating lever 107 by a spring 120 anchored to a post 121. The movement of the operating levers can be adjusted by the screws 122.

The pusher bar 118 is pivotally connected, as at 123 to a lever 124 which in turn is pivoted as at 125 to a rigid arm 126 secured to the cross bar 18. The lever 124 is provided with a yoke portion which carries a cam follower 129 adapted to cooperate with a cam 132 keyed to the main drive shaft 30 near the left hand side of the machine.

Upon rotation of the main drive shaft 30, the cam 132 is rotated to urge the lever 124 toward the front of the machine thus permitting the valves 112 to close and alternately to permit the lever 124 to be urged rearwardly by the spring 120 and thus open the valves 112.

Figure 37:
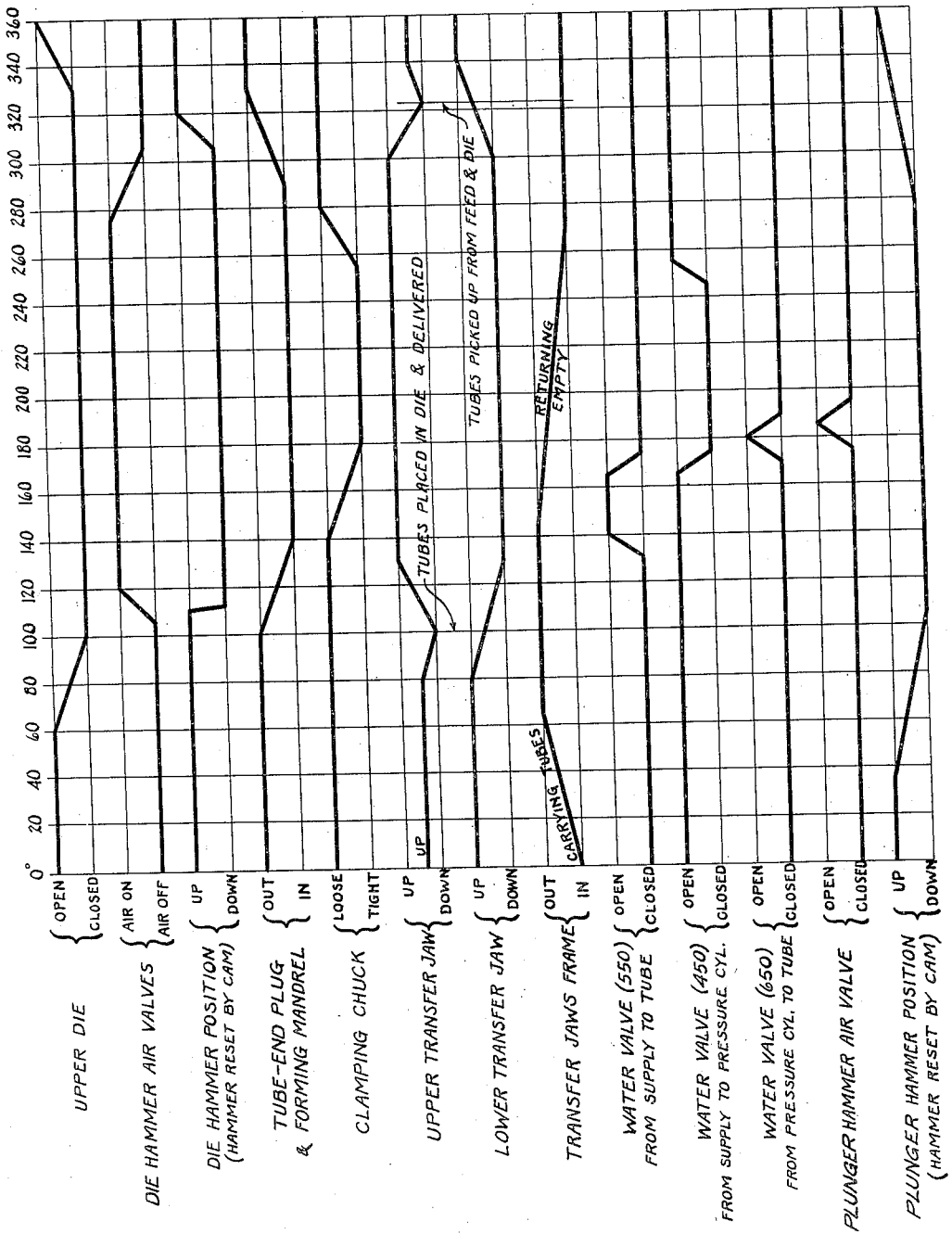
Fig. 37 is a chart showing diagrammatically the movement of the several parts of the apparatus in the course of a cycle of operation thereof.

As will be seen from Fig. 37, the die actuating cam 85 and the die hammer air valve cam 132 are so designed that the upper die 60 closes, whereafter the valves 112 are opened and compressed air is introduced into the cylinders of the air hammers 95 to energize the latter. The hammer head portions 98 are driven downwardly and each delivers a relatively powerful hammer blow to its respective anvil 99, which blows are transmitted by the associated members to the upper die 60 in unison thereby vigorously and suddenly forcing the upper die 60 tightly into seating engagement with the lower die 50.

The center legs 8 (Fig. 1) take much of the shock and the hammer blow thus does not displace the alignment of the dies.

The sharp seating of the upper die 60, against the lower die 50 drives out any air, water, oil or the like and provides accurate abutment of the die faces, thus the blank in the first die cavity is accurately shaped to hexagonal form. Also the cavity is accurately and firmly defined for the subsequent bulging operation.

The die hammer air valve cam 132 and the die actuating cam 85 are so designed that the hammer blow takes place when the upper die supporting yoke is entirely free of the outer wall 87 of the cam 85. Thus a quick sharp blow is applied to the upper die, no strain is exerted on the cam 85 or the main drive shaft 30, the maintaining of the dies in closed position is independent of wear of the upper die supporting mechanism, and the dies are held closed by other means than the upper die supporting mechanism.

Mechanism is also provided for returning the pistons 97 to their uppermost position in their respective cylinders (see Figs. 1, 6 and 7). Rigidly secured on the rods 103 are bearing blocks 135, which journal a transverse shaft 136 carrying levers 137 having head portions 138 positioned to bear against the lower ends of pistons 97 of the air hammers 95. Each cam 85 carries an external cam 140 adapted to engage the lever 137 and urge it upwardly into engagement with the piston 97 thus forcing the piston upwardly into its cylinder 96. Thus, upon predetermined rotation of the main drive shaft 30, the pistons 97 are returned to their uppermost, retracted position ready for another downward stroke. As will be seen from Fig. 37, the valves 112 are open and the hammers 98 are held in their lower positions until just prior to the opening of the dies; thus, the upper die 60 is resiliently held in closed position.

It might be explained at this point that the "0°" point on the chart of Fig. 37 represents the position and condition of the several parts of the machine at the time when the one revolution clutch is disengaged, the several parts being shown in this position and condition in the other figures of the drawings.

*The end heads*

For the purpose of closing and sealing the ends of the tube blank in the first die cavity during the bulging operation hereinafter described, end plugs or chucks are provided which are mounted on end heads for movement into and out of cooperation with the ends of the tube blank. The end heads also carry mandrels for enlarging the ends of a tube blank in the second die cavity.

Disposed in position to cooperate with the ends of tube blanks in the dies 50 and 60, are right and left end heads 150a and 150b respectively, each of which is slidable in a dovetailed way (Fig. 3) formed in a block 152 integral with the bed plate 2. The end heads are generally similar in construction, except as hereinafter particularly pointed out; hence, only one of these mechanisms will be described in detail herein, reference now being made to Figures 11 to 13.

*The end plugs or clamping chucks*

The end head 150a carries an end plug or clamping chuck 153a having a base 154 disposed in a bore 155 and seated against a shoulder 156; the base 154 is secured as by a set screw 157, preventing displacement of the position of the base 154. Extending from the base 154 is a stem or spindle 158 formed with a reduced end portion 159 preferably of circular cross section and adapted to enter the end of a tube blank in the first die cavity. The stem 158 is provided with a threaded portion 160 which receives a collet member 161 having a plurality, and preferably three, segmental fingers or jaws 162.

Slidably received over the collet member 161 is a sleeve 164 slidable in a recess 163 in the end head 150a. The sleeve 164 is formed at its outer end with an inclined or tapered surface 165 corresponding to a similarly inclined or tapered surface on the ends of the jaws 162.

The sleeve 164 is provided with spaced flanges defining a groove 167 adapted to receive a yoke 168 carried by a slide 169 slidable in a way formed in the end head 150a.

The slide 169 is formed with lugs defining therebetween a slot 171 which receives therein a head 172 formed on a bell crank lever 173 pivoted as at 174 to a bracket 175 carried on the end head 150a. The bell crank lever 173 is formed with an arm 176 which is actuated in a manner hereinafter described to cause the slide 169 to be urged to the right (as viewed in Fig. 11). When the slide is thus urged to the right, it moves the sleeve 164 correspondingly and the inclined surface 165 thereof bears upon the similarly formed surfaces of the jaws 162 to cause the jaws to contract toward the reduced end 159 of the stem 158 and grip the end of a tube blank against the reduced end when the tube blank is in the first die cavity; the end of the tube blank is thus both gripped and sealed and is prevented from spreading when the fluid pressure is applied inside the tube blank.

When the bell crank lever 173 is released, the natural resilience of the jaws 162 urge them outwardly and thereby causes the sleeve 164 to be urged to the left, thus returning the slide 169 to its original position. The jaws 162, by their inherent resiliency return to their normal position away from the reduced end 159 and release the end of the tube blank.

Referring now particularly to Figs. 12 and 13, the left hand end head 150b, its supporting mechanism, and its operating mechanism, are generally similar to the end head 150a. However, a bore 180 extends entirely through the stem or spindle 158 and the base 154 of the end plug or chuck 153b, and communicates with a passage 181 in a conduit 182 threaded into the end of the base 154. Extending into the conduit 182 is a pipe 184 and a sealing nut 185 containing packing 186 which seals the joints between the conduit 182 and pipe 184. Thus, pressure fluid can be conducted into the interior of the tube blank when the same is clamped in the end plugs or chucks 153a and 153b.

The mandrels

Each of the end heads 150a and 150b (see Figs. 5, 14-16) carries a mandrel or punch 187 forwardly of its end plug, substantially in the same plane, and in alignment with the second cavity of the dies, for the purpose of expanding the ends of the tube blank and imparting thereto the desired cross-sectional shape, which in the present case is hexagonal.

Referring now particularly to Figs. 14 and 15, wherein the end head 150b is shown in retracted position and in forward position respectively, the mandrel 187 is formed with a base 188 seated in a bore 189 in the end head 150b and is secured therein by a set screw 190, access to which is obtained through a sunk recess as indicated. The mandrel 187 is provided with an end portion 193 of hexagonal shape and a tapered point 194. Bearing against the rear end of the base 188 is the stem 195 of a bolt 196 threaded in the bore 189 and positioned by one or more lock nuts 197 to permit adjustment of the position of the mandrel 187.

When the end head 150b is moved to its forward position, the end of the mandrel 187 enters the end of the tube blank which is held in the second die cavity and expands the end of the tube blank to the desired diameter and at the same time imparts an hexagonal cross-sectional shape thereto. The end of the tube is outside of the die cavity and is more or less unconfined; the mandrel therefore plastically deforms the end of the tube to enlarge it without substantially thinning it; the end of the tube is shortened which provides the requisite material for enlarging the end diameter without causing a decrease in the thickness.

The mandrel 187 carried by the opposite end head 150a enters the opposite end of the tube blank and performs a similar operation thereon simultaneously with the operation of the first mandrel.

The recesses 56 and 62 are so dimensioned that the second die cavity has a diameter across flats of approximately 0.001 inch less than the first die cavity and thus, when the dies are closed, the tube blank 804 is firmly gripped between them and collapsing of the tube blank 804 under pressure of the mandrels is prevented. This is especially desirable owing to the fact that prior to shaping of the tube blank it is annealed at the portions at which the bulges are to be formed.

While the second die cavity firmly grips and slightly compresses the tube blank, nevertheless, the compression is not sufficient to permanently deform the blank and when the tube is removed from the dies, it has the size determined by the first die cavity.

It will be noted that the portion of the tube blank which is to be enlarged is outside of the die cavity and accordingly the die cavities 52 and 62 are provided with rounded corners at the ends of the dies, and the points 194 of the mandrels 187 are provided with similar rounded portions, thus preventing the mandrel and die from cutting, indenting or otherwise injuring the tube blank at the juncture of the body and the enlarged end.

Operating mechanism for the end heads and end plugs

The movement of the end heads 150a and 150b into and out of operative position cooperating with the dies 50 and 60 is controlled from the main drive shaft 30. Referring to Figs. 1, 3 and 7, a cam 200 is carried on the main drive shaft 30 and is formed with a cam track 201 in which rides a follower 202 pivotally mounted on a yoke 204. The arms of yoke 204, the drive shaft 30, and a connecting bar 206' secured to the top of the arms serves to strengthen the yoke.

The yoke 204 suspends a rod 207 slidable in a guide bearing 215 which rod in turn carries at its lower end a yoke 208 which receives therein one end 209 of a bell crank 210 pivoted on the main cross bar 18. The bell crank 210 has an arm 211 formed with a head and seated in a notch 214 in the end head 150a. The end 209 of the bell crank 210 is adjustably positioned in the yoke 208 by slidable blocks 205 and 206 secured suitably by bolts and positioned by adjusting screws 212, whereby the position of the bell crank can be adjusted relative to the yoke 208.

Upon suitable rotation of the main drive shaft 30, the cam 200 is actuated to lower the rod 207 and its attached yoke 208 and thus rotates the bell crank 210 in a clock wise direction (as viewed in Fig. 1 and Fig. 11), thereby moving the end head 150a into operative position in cooperation with the dies 50 and 60. Upon further movement of the drive shaft 30, the end head 150a is retracted into inoperative position. The left hand end head 150b is actuated in a similar manner by a generally similar mechanism associated therewith.

Actuation of the end plugs or clamping chucks

Referring now to Figs. 1 and 9, the end plug or clamping chuck 153b of the left hand end head 150b is closed by a mechanism actuated from the main drive shaft 30. The cam 85 hereinbefore described in connection with the actuation of the upper die 60 is provided with a cam track 220 in which rides a follower 221 pivoted to a yoke 223. The arms of yoke 223 receive the drive shaft 30, and a cross bar 225 joining the tops of the arms permits the yoke to execute a reciprocating vertical motion.

The yoke carries a rod 226 which is guided in a guide 224 carried on the main cross bar 18, which rod carries at its lower end a lug 225 having threaded therein an adjustable set screw 227 secured in position by a lock nut 228. The screw 226 is positioned to bear against the end 176 of the operating lever 173 of the end head slide 169.

Upon suitable rotation of the drive shaft 30, the yoke 223 and associated rod 226 are carried downwardly and the set screw 227 urges the arm 176 downwardly which thereby moves the slide 169, and the sleeve 164 in a direction to close the jaws 162 of the collet 161. Upon further rotation of the drive shaft 30, the rod 226 is raised to permit the bell crank 173 to be urged in the opposite direction by the spring action of the jaws 162, as hereinbefore described.

The feeding and discharging mechanism

The tube blanks 800 upon which the operations are to be performed are fed successively by a suitable feed device into feeding position to be there engaged by a transfer mechanism, hereinafter described, for movement into the dies.

Referring particularly to Figs. 3, 5 and 6, the feed device includes feed hopper 230 supported by brackets 231, 232 and 233 mounted on the bed plate 2 and having cooperating therewith adjusting screws 234 for adjusting the position of the feed hopper 230. The feed hopper 230 comprises an inclined floor 235 having upstanding side walls 236 provided with inturned flanges 237, all of which define an inclined slide; an opening 219 (Fig. 5), is formed in the floor 235. At the upper end of the slide 230, side walls 238 provide a hopper-like section suitable for receiving a considerable number of tube blanks, which automatically feed into the slide. The lower end of the slide floor 235 terminates adjacent the dies 50 and 60 in an upturned flange defining a stop 240 for a tube blank at the feeding position, designated by the reference character 239.

The tube blank 800 is advanced or transferred from feeding position 239 into the first die cavity (Fig. 6) and thereafter into the second die cavity by the transfer mechanism hereinafter described, whereafter the finished tube 806 is then removed from the second die cavity and discharged from the dies.

Fixedly secured adjacent the die 50 is one or more, and preferably at least two stops 241 (Figs. 1 and 6) adapted to assist in removal of the finished tube 806 from the transfer mechanism in a manner hereinafter described. Spaced from the stops 241 are guides 242 positioned to guide the finished tube 806 through a discharge slot 243 in the bed plate 2 from whence the tube drops into a delivery bin 244 constituted by an inclined floor 245, upstanding side walls 246 and a cover 247 hinged or otherwise movable to permit the removal of the tube.

The transfer mechanism

A transfer mechanism is provided for advancing the tube blanks from the feed hopper to the first die cavity, then to the second die cavity and finally for removing the finished tube from the second die cavity and discharging it into the delivery bin. The transfer mechanism includes generally, two sets of paired jaws adapted to engage simultaneously three tubes, namely, the tube blank in the feed hopper, the intermediate blank in the first die cavity and the finished tube in the second die cavity. The jaws are actuated by a suitable mechanism which closes them upon the tubes, causes them to lift the tubes out of their position, then forwardly one step to above the next position, and then downwardly into the next position. The jaws are then opened to permit the inward movement of the end heads and are finally returned to the initial position where they close upon another set of three tubes, i. e. a tube in feeding position, and the tubes in the two cavities.

The transfer mechanism comprises right and left hand portions which are similar but enantiomorphous in construction; accordingly, only one such portion will be described in detail.

Referring now particularly to Figs. 5, 6 and 17, a guide 217 is secured to the bed plate 2, as by bolts and comprises spaced parallel sides connected by a front cross bar 253.

Slidable in the guide 217 is a jaw carrier frame 256 (Fig. 20) the base of which is provided with side flanges 258 slidable in grooves formed in the guide 217, the bed plate 2 being relieved to prevent sticking of the slide (Fig. 17). Secured to, or integral with, the base of frame 256 are grooved uprights 260 connected at their upper ends by a top rail 262.

Slidably mounted in the frame 256 for vertical reciprocation therein, is a lower jaw carrier 264 (Fig. 19) and an upper jaw carrier 265 (Fig. 18). The lower jaw carrier 264 is formed with flanges 266 sliding in the grooved upright 260 and a flange 267 extending horizontally adjacent the top and defining a shoulder 296 for a purpose hereinafter described. An opening 268 extends through the lower jaw carrier 264 to accommodate the cam shaft 45 which extends through the lower jaw carrier 264, an opening 281 in the upper jaw carrier 265 and the frame 256. Secured to the lower jaw carrier 264 is a jaw supporting bar 269 having an offset portion carrying the lower jaw 263 which is secured thereto by a screw and slot construction 271. Adjustment of the jaw relative to the bars 269 is obtained by means of adjusting screws 273 extending through a flange 274 of the lower jaw 263 and abutting the bar 269.

The upper jaw carrier 265 (Fig. 18) is formed with vertical flanges 275 slidable in the grooved uprights 260 laterally adjacent the flanges 266 of the lower jaw carrier 264. The upper jaw carrier 265 is formed with a horizontal flange 276 defining a shoulder 288 for a purpose hereinafter described.

A second horizontal flange 277 extends from the opposite side of the jaw carrier 265 in position to overlie the lower jaw carrier 264 when the jaw carriers are in the frame 256 and is provided with adjusting screws 279 adapted to bear on the top surface of the lower jaw carrier 264. The upper jaw carrier 265 is also provided with an opening 281 to accommodate the cam shaft 45.

Secured to the upper jaw carrier 265 is a jaw supporting bar 282 having an offset portion to which the upper jaw 284 is secured as by a screw and slot construction 285. The upper jaw 284 is formed with a flange 286 through which adjusting screws 287 extend and abut the bar 282.

The lower jaw 263 is formed with two semicircular notches 289 and one semi-hexagonal notch 291, which three notches are adapted to cooperate with two semi-circular notches 292 and one semi-hexagonal notch 293 formed in the upper jaw 284, to provide, when the jaws are in closed position, openings for reception of the tube blanks 800 and 804 and the finished tube 806 respectively.

Referring particularly to Figs. 5 and 17, the cam shaft 45 carries a cam 295 (hereinafter called the "outside" cam) fixedly secured on the cam shaft and adapted to engage the shoulder 296 of the lower jaw carrier for raising the same. Also carried on the cam shaft 45 is a "center" cam 297 adapted to engage the shoulder 288 on the upper jaw carrier 265 for raising this member. The center cam 297 is formed with a hub portion on which is carried an "inner" cam 300 secured for rotation with the cam 297 by a screw.

Riding on the inner cam 300 is a follower 302 carried by a stud 303 secured in a block 304, which is secured to the frame 255. The frame 256 is normally urged toward the rear of the machine by a spring 306 (Fig. 3) secured at one end to a stud 307 which fits in the bed plate 2 and at the other end to an arm 308 secured to the frame 256. The forward movement of the jaw carrier frame 256 is limited by the throw of the cam 300 and the rearward movement is limited by a limit rod 254 threaded into the forward frame upright 260 and through the cross bar 253, and adjusting nuts 255 threaded on the outer end of the rod 254 to act as a stop.

The two frames 256 and the attached blocks 304 are connected for additional strength by a strap 309.

Upon suitable rotation of the cam shaft 45, the right and left hand inner cams 300 bear against their respective followers 302 thereby causing the connected frames 256 and their associated jaw carriers to be moved toward the front of the machine (herein also referred to as outwardly), against the tension of the springs 306. Upon further rotation of the cam shaft 45 and the cams 300 carried thereby, the frames are permitted to move inwardly under the influence of the springs 306.

The jaws 284 and 263 are correspondingly moved in and out with their frames 256. However, owing to the action of the cams 295 and 297, the jaw carriers 264 and 265 are caused to move vertically, thereby effecting alternate opening and closing of the jaws 263 and 284, as well as simultaneous vertical movement.

Referring to Figs. 6 and 17, when the inner cams are in the position illustrated, the upper jaw carrier 265 is supported on the lower jaw carrier (through the set screws 279) and both the upper and lower jaw carriers 264 and 265 are under the control of the outer cam 295, which moves them in a vertical direction simultaneously. Upon suitable rotation of the cam shaft 45. the center cam 297 is moved into contact with the shoulder 298 on the upper jaw carrier. and owing to the relative shapes of the cams 295 and 297, the upper jaw carrier 264 is lifted off the lower jaw carrier 265 and these members are moved apart vertically to open the jaws. When the jaws are in open position the end plugs and mandrels can move therebetween, as will be seen from Figs. 11, 12 and 15.

The approximate paths of travel of the upper and lower jaws 284 and 263 respectively, are illustrated somewhat diagrammatically in Figs. 35 and 36 in relation to the lower die 50, the paths illustrated being the paths traced by the center lines of the middle recesses 292 and 289 respectively. Referring particularly to Fig. 5, it will be noted that the jaws are positioned to engage the end portions of the tube blanks and tube which project beyond the dies, thus permitting movement of the jaws regardless of the position of the dies.

Referring particularly to Fig. 35, it will be seen that, starting at a point vertically above the recess 55 in the lower die 50, the upper jaw moves forwardly or "out" until it reaches the end of its horizontal travel which is a point vertically above the recess 56. Thereafter the jaw moves downwardly to the lowest point of its travel and then returns upwardly over the same path and continues upwardly in a vertical direction. The jaw then travels "in" until it is vertically above the recess 55 in the lower die and thereafter travels downwardly until it is substantially in line with the center line of the first die cavity, whereafter it retraces a part of its vertical path until it reaches the starting point.

Referring to Fig. 36, it will be seen that the lower jaw executes a movement, which corresponds to the movement of the upper jaw only throughout that portion of the path in which the jaws engage a tube blank or tube. Starting at a point corresponding to the starting point of the cycle shown in Fig. 35, the lower jaw moves out until it is vertically above the recess 56, whereupon it moves downwardly to deposit the tube blank in the recess and then continues on downwardly to the bottom of its travel; thereupon the jaw moves in until it is vertically under the recess 55 and then upwardly until it picks up the tube blank in the recess 55, whereafter it continues upwardly to the starting point of the cycle.

The movement of the transfer jaws, and the frame therefor, in relation to the time cycle of operation of the machine is illustrated in Fig. 37 wherein the sixth, seventh and eighth lines represent the movement of the upper and lower transfer jaws and the transfer jaw frame, respectively.

The complete feeding, transferring and discharging operation will now be understood. The tube blank 800 which has been picked up from the feeding position 239 by the jaws, is moved outwardly and into position over the recess 55 and then lowered into this recess. Simultaneously with this movement, the intermediate blank 801 which is in the cavity 55 is raised vertically, carried toward the front of the machine and then lowered into the die cavity 56. At the same time, the finished tube 806 which is in the cavity 56 is raised, carried horizontally toward the front of the machine and then lowered until it strikes the stops 241 (Fig. 6) which raise it relatively from the outer recesses 291 in the lower jaws and move it forwardly clear of the lower jaw 263 whereupon it drops between the offset jaw supporting bars (Fig. 5) and is guided by the stop or guide 242 (Fig. 6) through the slot 243 and drops into the delivery bin 244.

*The water supply system*

The water which is employed as a pressure fluid may be obtained from a city main or any reservoir providing a slight pressure on the water, and a sufficient quantity of water for operation. By reason of the novel design of the apparatus, only a relatively slight pressure is required and only a relatively small quantity of water need be supplied for a large number of cycles of operation of the machine.

Referring now to Figs. 2, 5, 21, 22 and 25 and in particular Figs. 21 and 22, a water supply pipe 315 leads from a source of water supply (not shown) to a water valve block 316 in which is located water-control valves 450, 550 and 650. The supply pipe 315 is threaded into the valve block 316 and communicates with a passage 318 connected by passages 319, 320, 321 and 322 to the pipe 184 which leads to the left hand end head 150b and which is threaded into the water block 316 as indicated at 323.

Leading off from a T 325 in the supply pipe 315 is a branch pipe 326 threaded as at 327 into the valve block 316 and communicating with a passage 329 therein which connects, by a passage 330 with the passage 322.

Leading from the water valve block 316 and communicating with the passage 320 therein is a pipe 331 which leads to a pressure cylinder 334 (see Figs. 2 and 23) hereinafter more fully described.

It will now be seen that the water supply pipe 315 is connected, through the passages in the water valve block 316, to the pipe 184 leading to the left hand end head 150b and, to the pipe 331 leading to the water pressure cylinder 334, and also that the pipe 331 is connected to the pipe 184.

The valves 450, 550 and 650 are provided for controlling the opening and closing of the passages in the water valve block 316 for the purpose of variously connecting the water supply 315 to the end head pipe 184 and to the pressure cylinder pipe 331.

Inasmuch as all of the valves 450, 550 and 650 are identical in construction, only one of the valves will be described in detail. Wherever the component members of the other valves are designated by reference characters, even though not expressly referred to in the specification, it will be understood that similar members bear reference characters having their last two digits similar and that the first digit designates and identifies the particular valve of which the member so designated is a part.

Referring particularly to Fig. 21, the water valve 650 includes a nipple 651 extending from the valve block 316 and having a chamber 652 therein aligned with the passage 322. Slidable in the chamber 652 is the stem of valve 650 having a tapered end 654 adapted to seat in a valve seat 655 formed in the passage 322.

The stem of valve 650 projects from the nipple 651 and is sealed therein by a sealing member 654 and at its outer end is formed with spaced flanges defining therebetween a groove 656 adapted to receive spaced studs 661 carried on the yoke arms 657 (see Fig. 1). The yoke arms 657 form a portion of a bell crank 660 pivoted in a bracket 662 rigidly secured to a block 317 which also supports the valve block 316.

The bell crank 660 (see 560) is normally urged in a clockwise direction, as viewed in Fig. 1, by a spring 663 (see 563) secured to a bracket 638 (see 538) carried by the main frame 1. Thus, the valve 650 is normally urged to the left (as viewed in Figs. 1 and 21) and is normally maintained in open position.

The water valves 450 and 550 are, in a generally similar manner, normally urged into open position.

*The pressure cylinder and actuating mechanism*

The pressure cylinder 334 which applies the shock-like pressure to the water for expanding the tube and the mechanism for actuating the pressure cylinder are seen in Figs. 1, 2, 23 and 25. Referring particularly to Fig. 23 the pressure cylinder 334 includes a cylinder 348 having a flange 349 secured to the bed plate 2 as by bolts 347 and a nipple portion 350 extending through the bed plate and receiving the pipe 331 which is sealed therein by a sealing nut 351. A passage 331' leads from the pipe 331 to the interior of the cylinder 348. A piston or plunger 352 slides in the cylinder 348 and extends through a sealing nut 353 which seals the lower end of the cylinder 348.

The piston or plunger 352 is actuated by a lever 356 (Figs. 1 and 2) having a striker 357 abutting a head 358 of the piston or plunger 352 and claw 359 engaging the other side of the head 358. The lever 356 is pivoted as at 360 in a yoke 361 suspended from the bed plate 2 by a rod 362.

The lever 356 is actuated by an air driven hammer 332 (herein sometimes referred to as the "plunger hammer") suitably secured to the frame 1 as by a bracket 363. The plunger hammer 332 is similar to the air hammer 95 previously described and includes a cylinder in which slides a piston having a hammer portion 366 adapted to strike an anvil 367 carried on the end of the lever 356 opposite the striker 357.

The plunger hammer 332 is actuated by compressed air from an air line 368 having therein a valve 369 provided with an operating lever 370 actuated by an air relay 740 (hereinafter more fully described). The valve 369 itself may be of any suitable construction but preferably it is substantially identical in construction with the air valve 112 illustrated in Fig. 10 and described hereinbefore in connection with the control of the air hammer 95.

The air line 368 leads from a suitable source of compressed air (not shown) to which it is connected by the main air line 371 in which is provided a main air valve 372.

The piston of the plunger hammer 332 is returned to its retracted position, or "reset," by a reset mechanism shown particularly in Figs. 1 to 3, and illustrated somewhat diagrammatically in Fig. 25. A stud 373 extending from the lever 356 rides in a slot 374 in a bar 375 pivotally connected as at 376 to a lever 377 fixedly secured to a shaft 378 suitably mounted for rocking movement, and in the present case, journaled in the pedestals 3 and 4. The shaft 378 is actuated from the main drive shaft 30 by a mechanism located at the right hand end of the machine, as shown more particularly in Fig. 3 of the drawings, to which reference now is made.

Rigidly secured to the main drive shaft 30 is a cam 379 which actuates a follower 380 carried on a lever 382 which is pivoted as at 383 on a bracket 384 formed on the main frame 1, and is urged in a clock-wise direction (as viewed in Fig. 3) by a spring 398. The lever 382 is pivotally connected as at 385 to a yoke 386 in which is threaded a push rod 387 extending rearwardly and having a handle portion 388. The push rod 387 is slidable in a guide and stop 389 secured to the bed plate 2 and carries a pusher lug 390 adjustably secured thereon as by a set screw 391 adapted to bear against a lever 392 fixedly secured on the shaft 378 for turning the shaft when the push rod 387 is actuated.

The guide and stop 389 is illustrated more in detail in Fig. 4 and is formed with a groove 393 for receiving the push rod 387, a flange 394 for attachment to the bed plate 2, an abutment surface 396 adapted to serve as a stop for the pusher lug 390, and an abutment surface 395 adapted to form a stop for lever 392.

When the main drive shaft 30 is suitably rotated, it rotates the cam 379 which rocks the lever 382 in a counter-clockwise direction (as viewed in Fig. 3), thereby urging the push rod 387 rearwardly. The pusher lug 390 thus is urged into abutment with the lever 392 and rotates it in a clockwise direction, thereby rotating the shaft 378. The shaft 378 accordingly rotates the lever 377 (at the left hand side of the machine) in a counter-clockwise direction, and this lever acting through the link 375 raises the anvil end of the lever 356 to reset the plunger hammer 332.

If it is desired to prevent the resetting of the plunger hammer, and thus prevent pressure being delivered to the water lines connected to the pressure cylinder, the push rod 387 can be raised to move the pusher lug 390 out of cooperation with the lever 392.

*The air relay system*

The water valves 450, 550, and 650, and the air valve 369 controlling the operation of the plunger hammer 332 are all actuated by an air relay system controlled by the rotation of the cam shaft 45. The air relay system comprises primarily four relays each having an air control valve and actuating mechanism therefor. Inasmuch as each of these relays and its associated mechanism are substantially similar in construction and operation, only one will be described in detail. Similar members of the several relays and actuating mechanisms bear reference characters which differ only in their first digits which indicate the relay, the last two digits being similar for similar members.

Referring now to Figs. 1, 2, 24 and 25 and in particular Fig. 25, the cam shaft 43 carries four cams 401, 501, 601 and 701, each of which is adapted to control the operation of its respective relay, the several cams being differently formed inasmuch as the respective relays are actuated at different times and for different periods.

The cam 401 cooperates with a follower 402 pivoted in a lever 403 which is in turn pivoted in a block 400 secured on the bed plate 2. The lever 403 is normally urged in a counter-clockwise direction (as viewed in Fig. 25) by a spring 405 and at its forward end is formed with a head adapted to bear against a stem 407 of a plunger 408, of a relay valve 415 (see Fig. 24).

The plunger 408 is slidable in a chamber 409 in a valve block 410 and is normally urged upwardly by a spring 411. The stem 407 extends through an enlarged opening 413 in a nut 412 which is threaded into the end of the chamber 409 and a flange 414 formed on the plunger 408 is adapted to close the opening 413 when the plunger 408 is in its upper position.

A pipe 416 threaded into the block 410 as by a union 419 communicates with the chamber 409 and leads to a chamber 417 in a block 418 forming a portion of a quick acting relay 440, and is threaded, as by a union, into a closure plate 404 closing the end of the chamber 417.

Slidable in the chamber 417 is a valve 421, the inner end (left hand end as viewed in Fig. 24) of which is adapted to abut the inner end wall 426 of the chamber 417. The valve 421 is carried on a stem 422 which reciprocates in an enlarged passage 423, extending through the block 418 and open to the atmosphere, which stem extends from the block, at its other end and carries one or more sealing washers 427 positioned by one or more nuts 451. An end sealing plate 424 is secured to the adjacent end of the block 418 for cooperation with the washers 427, and the washers are spaced therefrom when the valve 421 seats against the wall 426, for a purpose hereinafter more fully explained.

Extending from the passage 423 is a passage 431 which leads to the interior of a cylinder 433 in which slides a piston 439 carrying a stem 441 adapted to bear against the arm 460. The cylinder 433 extends through an opening in a shelf 438 extending from the frame 1, and is formed with a flange 470 cooperating with a mounting flange 434 formed on the block 418, between which flanges is disposed a sealing gasket 436. The block 418 and cylinder 433 are secured to the shelf 438 by bolts 435 extending through the flanges 434 and 470.

Compressed air for actuating the relay 440 is supplied from a manifold 399 (Figs. 2 and 25) connected to the main supply pipe 371 and connected to the relay by a pipe 430. Communicating with the pipe 430 is a passage 439 in the block 418 which leads to a circular recess or groove 428 of semi-circular cross-sectional shape in the end wall 426 which recess communicates directly with the chamber 417, when the valve 421 is in a position away from the wall portion 426. A passage 427 of reduced diameter extending through the valve 421, provides communication between the recess 428 and the chamber 417, when the valve is in position seated against the end wall 426.

The operation of the relay 440 and its actuating mechanism is as follows:

When the cam 401 on the cam shaft 45 is in such position that the follower 402 cooperates with the high portion of the cam 401, the relay valve spring 411 urges the valve stem 408 upwardly thereby closing the opening 413, and thus the chamber 417 in the block 418 is closed to the atmosphere. Air pressure applied to the pipe 430 communicates, through the passage 439, the passage 428 and the passage 427, with the chamber 417 and the air in the chamber 417 thereby is under pressure. Owing to the substantially greater effective area on the right hand side (as viewed in Fig. 24) of the valve 421 as compared to the effective area on the left hand side of the valve (namely, that portion of the end of the valve wall which closes the annular recess 428), the valve 421 is urged to the left. This opens both the passage 423 and the interior of the cylinder 433 to the atmosphere, thereby permitting the piston to be raised by the action of the spring 463 on the lever 460.

When the cam shaft 45 is suitably rotated, it brings the lower portion of the cam 401 into engagement with the follower 402, and the spring 405 urges the lever 403 in a counter-clockwise direction (as viewed in Fig. 25), against the force of the spring 411, thereby opening the chamber 409 to the atmosphere and accordingly providing communication between the atmosphere and the chamber 417. This relieves the pressure in the chamber 417, and the effective pressure on the left hand side of the valve 421 thereby becomes greater than the effective pressure on the right hand side of the valve 421 and the valve 421 is urged to the right. This movement of the valve 421 which is very short causes the sealing washers 427 to close the end of the passage 423 and communication then is provided from the pipe 430 thruogh the passage 439, passage 428, passage 423 and the passage 431 to the cylinder 433 above the piston 439 and the piston 439 is urged downwardly to effect angular movement of the lever 460 in a clockwise direction (as viewed in Fig. 24).

Referring now to Fig. 25, it will be seen that the movement of the lever 460 effects movement inward of the valve 450 thereby closing this valve.

In an analogous manner, it will be seen that when the cam 501 is in a position wherein the rise or high portion bears against the follower 502, the relay valve 515 is closed and the relay 540 is in inoperative position permitting the valve 550 to be opened under the influence of the spring 563. When the cam shaft 45 is rotated it brings the low portion of the cam 501 into cooperation with the follower 502, the relay valve 515 is opened and the relay 540 is thereby actuated to close the valve 550.

In an analogous manner, the cam 601 is rotated upon suitable rotation of the cam shaft 45 to control the opening and closing of the valve 650.

The relay 740 is actuated in a manner generally similar to the previously described relays except, however, that this relay does not control the operation of a water valve but controls the operation of the plunger hammer air control valve 369. When the high portion of the cam 701 cooperates with the follower 702, the relay 740 is in inoperative position and the valve 369 is closed. Upon suitable rotation of the cam shaft 45 to bring the low portion of the cam 701 into cooperation with its follower 701, the relay 740 is actuated to open the valve 369 and effect operation of the plunger hammer 332.

*Operation of the machine*

When the machine is to be made ready for operation, the water supply pipe 315 (Figs. 2 and 25) is connected to a suitable source of water (not shown); the air pressure supply line 371 is connected to a suitable source of compressed air at suitable pressure (not shown); the air supply pipes 110 for the air hammers are connected to a suitable source of compressed air; and the driving pulley 25 is connected as by a belt or other drive to a suitable source of driving power (not shown).

One or more, and preferably a plurality, of tube blanks 800 are placed in the feed hopper 230 (Fig. 3) and the leading tube blank, followed by the succeeding tube blanks, slides down the inclined floor 235 and into feeding position 239 (Fig. 6) against the turned up portion 240. The one revolution clutch 33 (Fig. 2) is thrown in and connects the flywheel 25 to the main drive shaft 30, which in turn drives the cam shaft 45.

After nearly an entire, preliminary cycle, the transfer jaws 263 and 284 (see Fig. 6) close and engage the tube blank 800 between the recesses 289 and 292, whereafter the jaws 263 and 284 raise the tube blank 800 vertically into the position illustrated, herein referred to as the "start of cycle," and the machine then begins its first working cycle.

As the cam shaft 45 is rotated further, the cams 300 (Figs. 5 and 6) urge their corresponding followers 302 outwardly, thereby urging the transfer frames 256 outwardly to carry the jaws 263 and 284 and the tube blank 800 toward the front of the machine until the tube blank 800 is vertically over the recess 55 in the lower edge. At this time the cams 295 have been rotated to such a position that, upon further rotation of the cam shaft 45 the jaw carrying frames 264 and 265 lower the jaws 263 and 284 and the tube blank 800 is lowered into the cavity 55.

After the tube blank 800 is seated in the cavity 55, the upper transfer jaw 284 is moved upwardly away from the tube blank 800 and the lower transfer jaw 263 continues its downward movement and moves away from the tube blank 800, thus separating the transfer jaws 263 and 284.

At about the time that the tube blank 800 reaches its position over the die cavity 55, the cam 85 rotated by the drive shaft 30, causes the upper die 60 to start its downward travel and the latter reaches its closed position against the lower die 50 at about the time that the tube blank 800 is deposited in the cavity 55.

During the downward movement of the die 60 and the yoke 77 (Figs. 1 and 6), the anvils 99 are moved downwardly away from their cooperating hammers 95. This rotation of the cam 85 brings the relieved portion 87 opposite the follower 82 and the yoke 77 is not supported by the cam 85.

Shortly after the upper die 60 has reached its closed position, the cam 132 (Figs. 1 and 7) actuates the push rod 118 to open the air hammer valves 112 and the hammers 98 are urged downwardly and strike their respective anvils 99 thereby delivering a sudden blow to the upper die 60. This blow imparts to the tube blanks 800 the shape of the first die cavity, which in the present example is hexagonal. The die hammer air valves remain open to maintain the upper die 60 resiliently against the lower die 50 during certain subsequent operations thereby insuring that the dies will remain in closed position.

At about the time that the upper die 60 reaches closed position, the cam 200 (Figs. 1 and 3) reaches a position where it causes the yoke 204 and rod 207 to rotate the bell crank 210 and urge the end heads 150a and 150b inwardly. The end plugs or clamping chucks 153a and 153b are thus moved inwardly into cooperation with the opposite ends of the tube blank 800 and the reduced end portions 159 (Figs. 11 and 12) enter the ends of the tube blank 800. The water pipe 184 leading from the water valve block 316 is thus placed in communication with the interior of the tube blank 800.

Immediately upon the completion of the inward movement of the end heads 150a and 150b to place the corresponding reduced end portions in the ends of the tube blanks 800, the sleeves 164 are retracted by the lever 176 to clamp the jaws 162 of the collets around the ends of the tube blank 800 and, thereby both clamp the tube blank 800 and seal the ends thereof.

During the latter portion of the movement of the end heads 150a and 150b, the cam shaft 45 rotates the cam 501 (Figs. 1 and 25) into a position wherein the high portion engages the follower 502 and causes the relay valve 515 to actuate the relay 540 and open the valve 550. Thus a direct connection is provided between water supply pipe 315 and the tube blank 800 and the tube blank is thus supplied with water, whereafter the valve 550 is closed.

Further rotation of the cam shaft 45 causes the water valve 40 which controls the passage of water from the water supply pipe 315 to the pressure cylinder 334, to be closed, thus closing all communication between the water supply pipe 315 and the passages in the water valve block 316.

Shortly after the closing of the water valve 450, the water valve 650, which controls the passage of water between the pressure cylinder 334 and the tube supply pipe 184, is opened, thereby providing direct communication from the pressure cylinder 334 to the tube blank 800 in the dies. Upon slight further rotation of the cam shaft 45, the relay 740 is actuated to open the water hammer air valve 369 thereby actuating the plunger hammer 332 to urge the plunger or piston 352 upwardly in its cylinder and thereby apply rapidly a substantial pressure in the nature of a shock-like blow to the water in the cylinder 334 and this pressure is transmitted to the water in the tube blank 800.

Upon application of the pressure to the water in the tube blank 800, the portions of the tube blank 800 which does not bear firmly against the walls of the first die cavity, and in particular, the portions of the tube blank 800 adjacent the recesses 57, are forced outwardly into contact with the walls of the cavity, thus forming bulged portions 805.

After the bulging pressure has been applied to the water by the pressure cylinder 334, the water valve 450 is again opened to permit the water from the water supply line 315 to enter on the pressure cylinder 334, and the cam 379 is rotated into a position wherein it actuates the water hammer reset mechanism (Figs. 1, 2 and 25) thereby raising the end of the lever 356 which carries the anvil 367 and resetting the piston of the plunger hammer 332. At the same time, the piston or plunger 352 is retracted and sucks the water into the pressure cylinder 348 preparatory to another water hammer blow.

After the tube blank 800 has been bulged, the clamping chucks 153 (Figs. 11 and 12) are again opened and the ends of the tube blank are freed and the end heads 150a and 150b can then be moved away from the ends of the tube blank, which latter operation takes place promptly after the clamping chucks 153 are opened.

During the bulging operation, the cam shaft 45 rotates to effect the return of the transfer jaws from their forward position to their rearward position, and as soon as the jaws reach a position vertically in alignment with the feeding position 239, they are actuated by their respective cams to close upon the next tube blank 800 in the feeding position 239. The next tube blank 800 is then picked up by the jaws and raised to the position illustrated in Fig. 6 and is thereafter carried forwardly into a position vertically over the first die cavity 55, after which the tube blank 800 is lowered vertically into the die cavity 55 and the jaws are again opened as above described.

During the movement of the transfer jaws to pick up a tube blank 800 from the feeding position 239 and advance it forwardly of the machine and deposit it in the die cavity 55, a somewhat analogous movement is executed by the jaws on the tube blank 804 which was bulged in the first die cavity. This movement of the tube blank 804 is illustrated diagrammatically in Fig. 34, wherein it will be seen that the transfer jaws, which follow the movement diagrammatically shown in Figs. 35 and 36 respectively, carry the tube upwardly then forwardly and then downwardly into the die cavity 56.

With the tube blank 800 reposing in the first die cavity, and the intermediate tube blank 804 reposing in the second die cavity, the above described cycle of operation is repeated. The operations upon the tube blank 800 in the first die cavity are identical with those above described.

The operation of the several portions of the apparatus during the next cycle of operation are identical with those of the first cycle, all of the cycles of operation being identical. However, the tube blank 804 is disposed in the second die cavity in position to cooperate with the mandrels 187, and as the end heads 150a and 150b are moved inwardly after the closing of the dies, the hexagonally shaped end portions 193 of the mandrels 187 enter the ends of the tube blank 804 respectively and impart to these portions of the tube blank a hexagonal shape, the ends being also enlarged by this operation, by reason of the enlarged diameter of the hexagonal end portions 193.

Inasmuch as the tube blank 804 is securely clamped in the second die cavity, it is not necessary to clamp the ends, but the material of the ends is free to undergo plastic deformation in accordance with the pressure of the mandrels toward one another endwise of the tube blank.

It will be noted that, owing to the exact registration between the recesses in the transfer jaws and the tube blank 804 and the exact and accurately controlled movement of the transfer jaws, the tube blank 804 which has a hexagonal body shape is accurately deposited in the recess 56 in the lower die 50, prior to the closing of the dies, in exact registration with the cavity and thus no further registering action is required, but the tube blank 804 will register with the hexagonally shaped mandrels so that the tube will be formed accurately and without distortion.

During the third cycle of operation of the machine, a third tube blank 800 is transferred from the feeding position into the first die cavity, the second tube blank 804 is transferred from the first die cavity to the second die cavity, and the finished tube 806 is removed from the second die cavity and discharged from the machine in the manner described hereinbefore in connection with the operation of the transfer mechanism. Thus, it will be seen that the transfer jaws in the course of their movement during the third cycle and subsequent cycles, operate upon two tube blanks 800 and 804 and a finished tube 806 simultaneously, so long as tube blanks 800 continue to be fed to the machine.

The finished tubes which are collected in the collecting bin are ready, after suitable cleansing, for assembly in a heat exchanger core or whatever other use they may be intended.

Various modifications may be made in the structure above described, without departing from the scope of the invention. In a second, and in certain instances, a preferred embodiment, air controlled relays are substituted for the cams previously described for closing the chucks which clamp the ends of the tube blank. This embodiment of the invention is illustrated in Figs. 38 and 39 of the drawings.

For reasons of simplicity and clearness, only a portion of the left-hand side of the machine is illustrated, all of the portions not illustrated being similar in all respects to the corresponding portion of the machine illustrated in Figs. 1 to 37 of the drawings and described in the corresponding description. For convenience, certain portions of the construction illustrated in Fig. 38 are indicated by reference characters, but not specifically described. These portions which bear reference characters followed by the letter x are similar to portions bearing corresponding reference characters in Figs. 1 to 37.

Referring now particularly to Fig. 38, the lever 176x which moves the chuck-operating slide 169x, is normally urged in a counter-clockwise direction by a spring 1001 anchored to the bearing block 1002, hereinafter more fully described. The lever 176x is operated by an air actuated relay 940 generally similar in construction and operation to the relay 440 illustrated particularly in Fig. 24 of the drawings.

The relay 940 is controlled by a valve 915 similar to the valve 415 and actuated by a cam 901 mounted on the cam shaft 45x. Bearing against the cam 901 is a roller 902 carried by a lever 903 normally urged in a counter-clockwise direction by a spring 905 and adapted to bear against a valve stem 907 urged upwardly by a spring 911.

A pipe 916 provides a communication between the valve chamber 909 in the valve block 910 and the housing 918 of the relay 940. A continuation of the pipe 916 leads to a similar housing (not shown) on the other side of the machine and forming a portion of a relay, similar to the relay 940, for operating the chuck actuating lever at that side of the machine.

A pipe 930 leads from the manifold 399x to the housing 918, and a continuation of this pipe leads to the corresponding housing (not shown) of the other air actuated relay previously mentioned.

The relay 940 is suitably mounted on the bearing block 1002 and preferably the cylinder 933 extends through a bracket portion 1003 and is secured therein in a manner analogous to that in which the shoulder 433 is secured to the shelf 438 (Fig. 24.)

The control cam 801 is so shaped that the relay 940 is actuated to close the chuck during a period corresponding generally to the period illustrated in Fig. 37. However, owing to the employment of the quick-acting relay 940, the chuck is closed much more rapidly than when a cam is employed for this purpose. Accordingly, when the relay 940 is employed the line of Fig. 37 indicating the operation of the chuck will indicate a more rapid closing and opening of the chuck.

By employing a quick-acting relay instead of a cam for operating the chuck, the entire cycle of operation may be shortened, where this is desirable. Moreover, the quick actuation of the chuck operating lever, in certain cases, causes the chuck to be clamped more tightly against the end of the tube than where the closing movement is slower.

As noted above in connection with the first described embodiment of the invention, the actual resilience of the chuck jaws may in many cases be sufficient to cause the chuck to open, nevertheless it is often desirable to provide additional means for assisting the chuck. The spring 1001, shown in Fig. 38, serves this purpose.

The chuck at the right-hand side of the machine is operated in a manner similar to the first chuck, by a similar quick-acting relay, which is connected to the control valve by the continuation of the of the pipe 916 and to the manifold by the continuation of the pipe 930, as above described. The second relay, therefore, is operated simultaneously with the relay 940 on the left-hand side of the machine and thus both clamping chucks operate in unison.

While certain novel features of the invention have been disclosed herein, and are pointed out in the annexed claims, it will be understood that various omissions, substitutions and changes may be made by those skilled in the art without departing from the spirit of the invention.

This application is a continuation in part of my co-pending application Serial No. 296,824, filed September 27, 1939.

What is claimed is:

1. Apparatus for shaping tubes and the like, comprising die means having a cavity therein for receiving a tube blank, means for shaping the body of the tube to a substantially polygonal cross-sectional shape while in said cavity, and means operable after said first means for expanding the tube body at a portion thereof intermediate the ends while the tube blank is in said cavity.

2. Apparatus for shaping tubes and the like, comprising separable die members, mechanical means for moving at least one of said die members between open and closed position, means for disengaging said mechanical means substantially at the end of the closing movement of said die members, fluid actuated means active when said mechanical means are disengaged for resiliently urging said die members into closed position, and means for imparting tube-shaping pressure to the interior of a tube while located between said die members and while said fluid actuated means are active.

3. Apparatus for shaping tubes and the like, comprising die means defining a cavity for a tube to be shaped, head members movable into and out of cooperation with said die members, stems carried by said head members and positioned to enter into the ends of said tube, movable fingers carried by said head members for radially clamping the ends of said tube around said stems, and means for actuating said fingers when said head members are in position cooperating with said die members.

4. Apparatus for shaping tubes and the like, comprising die means defining a cavity for a tube to be shaped, head members movable into and out of cooperation with said die means, cylindrical stems carried by said head members and positioned to enter a small distance into the ends of said tube, devices carried by said head members for radially clamping the ends of said tube around said stems, means for actuating said clamping devices when said head members are in position cooperating with said die members, a source of pressure fluid, and means including a passage through at least one of said stems connecting said source with the interior of a tube in said cavity.

5. Apparatus for shaping tubes and the like, comprising die means, cooperable jaws adapted to engage a tube, a frame reciprocable with respect to said die means, carriers for said jaws reciprocable in said frame, means for reciprocating said carriers in said frame to open and close said jaws, and means for reciprocating said frame to move said jaws simultaneously with respect to said die means.

6. Apparatus for shaping tubular articles and the like, comprising a die having a cavity therein for receiving a tube to be shaped, a source of fluid, pressure applying means, means for connecting said source of fluid to the interior of a tube in said cavity, means for connecting said source of fluid to said pressure applying means, means for closing communication between said source of fluid and said tube and between said source of fluid and said pressure applying means, means for connecting said pressure applying means to the interior of said tube, and means active when said pressure applying means is connected to the interior of said tube for energizing said pressure applying means to deliver a shock-like pressure blow to said fluid in said tube.

7. In a machine for shaping thin-walled tubes, a frame, a lower die mounted on said frame, an upper die slidably mounted on said frame, a support connected to said upper die, a follower connected to said support, a drive shaft journaled in said frame, a cam on said shaft driving said follower to reciprocate said upper die, said support having a yoke straddling said drive shaft and carrying an anvil, an air hammer comprising a cylinder mounted on said frame and a piston adapted to engage said anvil, said cam being relieved at the position at which pressure is applied to said air hammer to permit said air hammer to hold said die sections tightly closed.

8. In a machine for shaping thin-walled tubes, tube engaging elements comprising a feed chute having a stop constituting a feed position, dies having first and second cavities, and a delivery device; all of said elements being located substantially in the same plane and said tubes projecting beyond the ends thereof, transfer devices, one located at each end of said elements, each of said transfer devices comprising a guideway, a carrier frame slidable on said guideway transversely of the tubes, vertically slidable upper and lower jaw carriers on said frame, upper and lower jaws carried by said jaw carriers, said jaws each having three notches therein whereby tubes are transferred from said feed position to said first die cavity, thence to said second die cavity, and thence to said delivery device successively, said carrier frame and upper and lower jaw carriers having openings therein, a control shaft passing through said openings, cams on said control shaft for individually engaging said carrier frames, upper jaw carriers and lower jaw carriers.

9. In a machine for shaping thin-walled tubes, a feed device, dies having a plurality of cavities, a delivery device, said tubes projecting beyond the ends of said dies and of said devices, transfer devices, one located at each end of said tubes, each of said transfer devices comprising a guideway, a carrier frame slidable on said guideway transversely of the tubes, said carrier frame having a guideway extending transversely of said tubes and of said first-mentioned guideway, slidable first and second jaw carriers on said guideway frame, first and second jaws carried by said jaw carriers, said jaws having a plurality of notches therein whereby tubes are transferred from said feed device to said die cavities and thence to said delivery device successively, a control shaft, cams on said control shaft for individually engaging said carrier frames, upper jaw carriers and lower jaw carriers.

10. In a machine for handling elongate objects, a feed device, a plurality of operating devices, a delivery device, said objects projecting beyond the ends of said devices, transfer devices, one located at each end of said objects, each of said transfer devices comprising a guideway, a carrier frame slidable on said guideway transversely of the objects, slidable opposed first and second jaw carriers on said frame, first and second jaws carried by said jaw carriers, said jaws each having holding parts whereby objects are transferred from said feed device to said operating devices and to said delivery device successively, said carrier frame and first and second jaw carriers having openings therein, a control shaft passing through said openings, cams on said control shaft for individually engaging said carrier frames, first jaw carriers and second jaw carriers.

11. In a machine for handling objects, a plurality of positions, a transfer device comprising a guideway, a carrier frame slidable on said guideway in the direction of movement of said objects, said frame having a guideway extending transversely of said direction of movement, slidable first and second jaws on said frame, said jaws having parts engaging said objects to transfer them between said positions.

12. In a device of the character described, means for conveying an elongate article between a plurality of parallel preceding and successive positions, said means comprising lower and upper jaw members at each end of said article, said lower jaw members having a cyclic movement starting from a point directly above said article in any preceding position, first forwardly in the direction of travel of the tubes to a point in line with the next successive position, then downwardly to deposit the tube in said next successive position, then further downwardly below the level of said successive position, then backwardly to a point in line with the preceding position, then upwardly to a point in register with said preceding position, thence continuing upwardly to the point of beginning; said upper jaw members having a cyclic movement starting from a point directly above said article in said preceding position, first forwardly in the direction of tube movement to a point in line with said successive position, then downwardly to deposit the tube in said successive position, then upwardly to a level greater than said first level, then backwardly to a position in line with said preceding position, then downwardly to register with said article in said preceding position, then upwardly to the point of beginning.

13. In a device of the character described, first and second jaw members for conveying an elongate article between a plurality of parallel positions, said first jaw member having a cyclic movement starting from a point above said article in any preceding position, first forwardly in the direction of travel of the tubes, then downwardly to deposit the tube in said next successive position, then further downwardly, then backwardly, then upwardly to a point in register with said preceding position, thence continuing upwardly to the point of beginning; said upper jaw member having a cyclic movement starting from a point above said article in said preceding position, first forwardly in the direction of tube movement, then downwardly to deposit the tube in said successive position, then upwardly, then backwardly, then downwardly to register with said article in said preceding position, then upwardly to the point of beginning.

14. In a machine for shaping thin-walled tubes, a die having a die cavity to hold a tube with the ends projecting therefrom, an end head comprising a stem adapted to fit within the tube, a chuck comprising a support having resilient jaws adapted to engage the outside of the tube, said jaws having tapered surfaces, a collar engaging said tapered surfaces, means for bodily moving said head relatively to the tube and longitudinally thereof, and means for moving said chuck collar relatively to the jaws thereof.

15. In a machine for shaping thin-walled tubes, a die having a die cavity to hold a tube with the ends projecting therefrom, an end head comprising a stem adapted to fit within the tube, a chuck comprising a support having resilient jaws adapted to engage the outside of the tube, said jaws having tapered surfaces, a collar engaging said tapered surfaces, means for bodily moving said head relatively to the tube and longitudinally thereof, and means for moving said chuck collar relatively to the jaws thereof, said stem having an opening therethrough for the passage of a fluid to shape the tube.

16. In a machine for shaping thin-walled tubes, a die having a cavity for the tube, a device engaging the end of said tube to supply liquid to the interior thereof, a liquid ram for supplying pressure to said liquid, a source of liquid supply, a liquid valve arrangement for connecting said supply to said device and to said liquid ram, an air hammer for operating said ram, an air valve controlling compressed air to said air hammer, and a plurality of air relays controlling said air valve and said liquid valves, and means for controlling said air relays.

17. In a machine for shaping thin-walled tubes, a die having a cavity for the tube, a device engaging the end of said tube for conducting a liquid to the inside of the tube, a liquid ram for imparting a pressure to said liquid, an air hammer for imparting a shock to said ram, a liquid valve block having a first connection to said device, a second connection to said ram and a passage joining said connections, a source of liquid supply having a first branch joining said passage near said first connection and a second branch joining said passage near said second connection, first and second valves in said branches respectively and a third valve in said passage between said first and second connections, means for opening said first valve to supply liquid to the tube, means for opening said second valve to supply liquid to said ram, means for opening said third valve to communicate liquid pressure from said ram to the inside of said tube.

18. In a machine for shaping thin-walled tubes, a base, a lower die section on said base, a movable upper die section, said die sections having first and second cavities, a feed device, a delivery device, transfer jaws at the ends of said die sections for engaging the ends of said tubes to move them transversely of their lengths through the machine, said base having guideways at the ends of said die sections and extending lengthwise thereof, end heads slidable on said guideways, each end head carrying a chuck to engage the outside of the tube and a stem to engage the inside of the tube while in said first die cavity, each end head also carrying an expanding mandrel for engaging the inside of the tube while in the second die cavity.

19. In a machine for shaping thin-walled tubes, a base, die sections on said base having first and second cavities, means to move said tubes transversely of their lengths through the machine, said base having guideways at the ends of said die sections and extending lengthwise thereof, end heads slidable on said guideways, each end head carrying a chuck to engage the outside of the tube and a stem to engage the inside of the tube while in the first die cavity, each end head also carrying an expanding mandrel for engaging the inside of the tube while in the second die cavity.

20. In a machine for shaping thin-walled tubes, a die having a cavity for the tube, a chuck engaging the end of said tube to supply liquid to the interior thereof, a liquid ram for supplying pressure to said liquid, a source of liquid supply, a liquid valve arrangement for connecting said supply to said chuck and to said liquid ram, a plurality of fluid relays individually controlling said ram, said liquid valves and said chuck, said fluid relays each comprising a pilot valve and a master valve, means for individually controlling said master valves whereby the operation of said master valve causes said pilot valve to cause fluid pressure to quickly operate the particular device to which the pilot valve is connected.

21. In a machine for shaping thin-walled tubes, a die having a cavity for the tube, a chuck engaging the end of said tube to supply liquid to the interior thereof, a liquid ram for supplying pressure to said liquid, a source of liquid supply, a liquid valve arrangement for connecting said supply to said chuck and to said liquid ram, an air hammer for operating said ram, an air valve controlling compressed air to said air hammer, a plurality of air relays individually controlling said air valve, said liquid valves and said chuck, said air relays each comprising a pilot valve and a master valve, means for individually controlling said master valves whereby the opening of said master valve causes said pilot valve to connect air pressure to its driving piston to quickly operate the particular device to which it is connected.

22. Apparatus for shaping tubes comprising a die having a cavity, means for feeding successively a plurality of tubes to said cavity, said tube being located in said cavity with an end projecting therefrom, a source of hydraulic liquid externally of said die, connections between said source and said tube to supply liquid to said tube, said connections including a member movable relatively to said die, said member having means adapted to surround and grip the projecting end of said tube and then to release said tube to make way for a succeeding tube, a pressure applying device associated with said connections to apply pressure to said liquid, and a hammer for delivering a blow to said pressure applying device to apply a shock to said liquid to deform part of the tube within said cavity.

23. Apparatus for shaping thin wall tubes and the like comprising separable die members, mechanical actuating means for moving at least one of said die members between open and closed positions, means for disengaging said actuating means substantially at the end of the closing movement thereof, fluid means active upon disengagement of said actuating means for maintaining said die members in closed position, means for impressing a bulging pressure on the interior of a tube located between said die members when the latter are closed, said bulging pressure being resisted by said fluid means.

24. Apparatus for forming one or more local enlargements in thin wall tubes comprising a mold defining a cavity adapted to receive a tube, said cavity having a recess therein corresponding in shape and size to the local enlargement desired, means for opening and closing said mold to receive a tube blank, a source of hydraulic liquid external of said mold, connecting devices extending from said source to said tube to supply said hydraulic liquid to the interior of said tube while in said mold, a pressure applying device external of said mold, and an air hammer for delivering a blow to said pressure applying device for applying a shock to said liquid sufficient to expand the walls of said tube outwardly against the walls of said recess.

25. In a machine for shaping thin wall tubes, a base, die sections on said base having die cavities, a feed device, a delivery device, transfer devices at the ends of said die sections for engaging the ends of the tubes to move them transversely of their lengths through the machine from said feed device to said delivery device, said base having a guideway at the end of said die sections and extending lengthwise thereof, an end head slidable on said guideway, said end head carrying fluid means for applying bulging pressure to a tube in said cavities.

26. In a machine for shaping thin-walled tubes, a base, die sections on said base having first and second cavities, means to move said tubes transversely of their lengths through the machine, said base having end heads at the ends of said die sections and means for moving said end heads generally lengthwise of said die sections, each end head carrying a chuck to engage the outside of the tube and a stem to engage the inside of the tube while in the first die cavity, each end head also carrying an expanding mandrel for engaging the inside of the tube while in the second die cavity.

27. In a machine for mass producing thin wall tubes, a die having a cavity for the tubes, means for feeding a succession of tubes to said cavity, a device to supply liquid to the interior of the tube in said cavity, a liquid ram arrangement for supplying pressure to said liquid, a source of liquid supply, a liquid valve arrangement for connecting said supply to said device and to said liquid ram, a plurality of fluid relays for individually controlling said ram and liquid valve arrangements, each fluid relay comprising a pilot valve having a driving member and a master valve; a source of fluid pressure, a plurality of control members for individually controlling their particular master valves, said master valves governing said pilot valves to cause said fluid pressure to quickly drive said driving members to operate said ram and liquid valve arrangements.

28. In a machine for mass producing thin wall tubes, a die having a cavity for the tubes, means for feeding a succession of tubes to said cavity; operation-performing devices for operating upon said tubes including a chuck removably engaging the end of the tube while in said cavity to supply liquid to the interior of the tube, a liquid ram arrangement for supplying pressure to said liquid, a source of liquid supply, a liquid valve arrangement for connecting said supply to said chuck and to said liquid ram; a plurality of air relays for individually controlling said devices, each air relay comprising a pilot valve and a master valve, said pilot valve having a high pressure port and an exhaust port, a movable pilot member normally closing said high pressure port, and means for normally balancing the pressure on the opposite sides of said movable pilot member, an operating piston in said pilot valve for driving its particular operation-performing device, means controlled by the opening of said master valve for disturbing the balance of said pilot member and admitting pressure to said operating piston to operate its particular operation-performing device, a plurality of cams for controlling the several devices, each cam opening its particular master valve.

EMILIEN BLAIS.